(12) United States Patent
Zhang et al.

(10) Patent No.: US 12,479,467 B2
(45) Date of Patent: Nov. 25, 2025

(54) USING NEURAL NETWORKS TO MODEL RESTRICTED TRAFFIC ZONES FOR AUTONOMOUS VEHICLE NAVIGATION

(71) Applicant: GM Cruise Holdings LLC, San Francisco, CA (US)

(72) Inventors: Jingdan Zhang, Pittsburgh, PA (US); Changkai Zhou, Mountain View, CA (US); Elad Plaut, Mountain View, CA (US); Shuqin Xie, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 251 days.

(21) Appl. No.: 18/307,624

(22) Filed: Apr. 26, 2023

(65) Prior Publication Data

US 2024/0359705 A1   Oct. 31, 2024

(51) Int. Cl.
*B60W 60/00* (2020.01)
*B60W 40/02* (2006.01)
(Continued)

(52) U.S. Cl.
CPC .......... *B60W 60/001* (2020.02); *B60W 40/02* (2013.01); *G01C 21/3461* (2013.01);
(Continued)

(58) Field of Classification Search
CPC ............... B60W 60/001; B60W 40/02; B60W 2554/00; B60W 2556/40; G06N 3/08;
(Continued)

(56) References Cited

U.S. PATENT DOCUMENTS 11,195,038 B2 * 12/2021 Nunn ..................... G06V 10/82
11,482,015 B2 * 10/2022 Shih ..................... G06V 10/764
(Continued)

OTHER PUBLICATIONS

Situation identification techniques in pervasive computing (Year: 2011).*
(Continued)

*Primary Examiner* — Fadey S. Jabr
*Assistant Examiner* — Faris Asim Shaikh
(74) *Attorney, Agent, or Firm* — CANTOR COLBURN LLP

(57) ABSTRACT

The navigation of an AV in an environment may be planned based on a model of a restricted traffic zone in the environment. Information of the environment (e.g., a vector map, information of one or more objects, a temporal sequence of semantic grids, a query grid, etc.) may be input into a neural network. The neural network may include a CNN and a GNN. The map and tracks may be input into the GNN. The temporal sequence of semantic grids or query grid may be input into the CNN. The neural network may output edges of the restricted traffic zone. The neural network may output a grid of points representing locations in the environment and information indicating drivability of each respective point. The neural network may output one or more polylines dividing the environment into regions and information indicating whether the AV can drive to or in each respective region.

14 Claims, 9 Drawing Sheets

(51) Int. Cl.
  *G01C 21/34* (2006.01)
  *G05B 13/02* (2006.01)
  *G06N 3/045* (2023.01)
  *G06N 3/0464* (2023.01)
  *G08G 1/00* (2006.01)

(52) U.S. Cl.
  CPC ........... *G05B 13/027* (2013.01); *G06N 3/045* (2023.01); *G06N 3/0464* (2023.01); *B60W 2554/00* (2020.02); *B60W 2556/40* (2020.02); *G08G 1/22* (2013.01)

(58) Field of Classification Search
  CPC .. G06N 3/045; G06N 3/0464; G01C 21/3804; G01C 21/3461; G08G 1/22; G05B 13/027
  See application file for complete search history.

(56) References Cited

U.S. PATENT DOCUMENTS

| | | | |
|---|---|---|---|
| 12,233,901 B2* | 2/2025 | Garimella | B60W 60/001 |
| 2016/0171316 A1* | 6/2016 | Fritsch | G06V 20/584 382/104 |
| 2019/0147255 A1* | 5/2019 | Homayounfar | G05D 1/0088 701/23 |
| 2019/0258251 A1* | 8/2019 | Ditty | G05D 1/0274 |
| 2019/0258907 A1* | 8/2019 | Rezende | G06T 7/90 |
| 2019/0266418 A1* | 8/2019 | Xu | G06V 10/457 |
| 2019/0384304 A1* | 12/2019 | Towal | G06T 7/60 |
| 2020/0258385 A1* | 8/2020 | Mahajan | G01S 17/931 |
| 2021/0042540 A1* | 2/2021 | Shih | B62D 15/0285 |
| 2021/0114586 A1* | 4/2021 | Graefe | G08G 1/147 |
| 2021/0150230 A1* | 5/2021 | Smolyanskiy | G06V 10/82 |
| 2021/0213940 A1* | 7/2021 | Zhang | G06T 7/246 |
| 2021/0253132 A1* | 8/2021 | Coimbra De Andrade | G05D 1/0278 |
| 2021/0383687 A1* | 12/2021 | Stenneth | G08G 1/0116 |
| 2022/0198928 A1* | 6/2022 | Liu | G01C 21/28 |
| 2022/0207277 A1* | 6/2022 | Ip | G06V 10/44 |
| 2022/0274625 A1* | 9/2022 | Garimella | G06N 3/04 |
| 2023/0125073 A1* | 4/2023 | Raghunathan | G06N 3/09 706/25 |
| 2023/0243658 A1* | 8/2023 | Yilmaz | G01C 21/005 701/400 |
| 2023/0360375 A1* | 11/2023 | Kabzan | G06N 20/00 |
| 2025/0022257 A1* | 1/2025 | Jeong | G06N 7/00 |

OTHER PUBLICATIONS

Structured Sequence Modeling With Graph Convolutional Recurrent Networks (Year: 2016).*
Semantic Grid Estimation with Occupancy Grids and Semantic Segmentation Networks (Year: 2018).*
Safe Trajectory Generation for Complex Urban Environments Using Spatio-Temporal Semantic Corridor (Year: 2019).*
Rules of the Road: Predicting Driving Behavior with a Convolutional Model of Semantic Interaction (Year: 2019).*
Pervasive and Mobile Computing (Year: 2012).*

* cited by examiner

USING NEURAL NETWORKS TO MODEL RESTRICTED TRAFFIC ZONES FOR AUTONOMOUS VEHICLE NAVIGATION

TECHNICAL FIELD OF THE DISCLOSURE

The present disclosure relates generally to autonomous vehicle (AV) and, more specifically, to using neural networks to model restricted traffic zones for AV navigation.

BACKGROUND

An AV is a vehicle that is capable of sensing and navigating its environment with little or no user input. An AV may sense its environment using sensing devices such as Radio Detection and Ranging (RADAR), Light Detection and Ranging (LIDAR), image sensors, cameras, and the like. An AV system may also use information from a global positioning system (GPS), navigation systems, vehicle-to-vehicle communication, vehicle-to-infrastructure technology, and/or drive-by-wire systems to drive the vehicle. As used herein, the phrase "AV" includes both fully autonomous and semi-autonomous vehicles.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
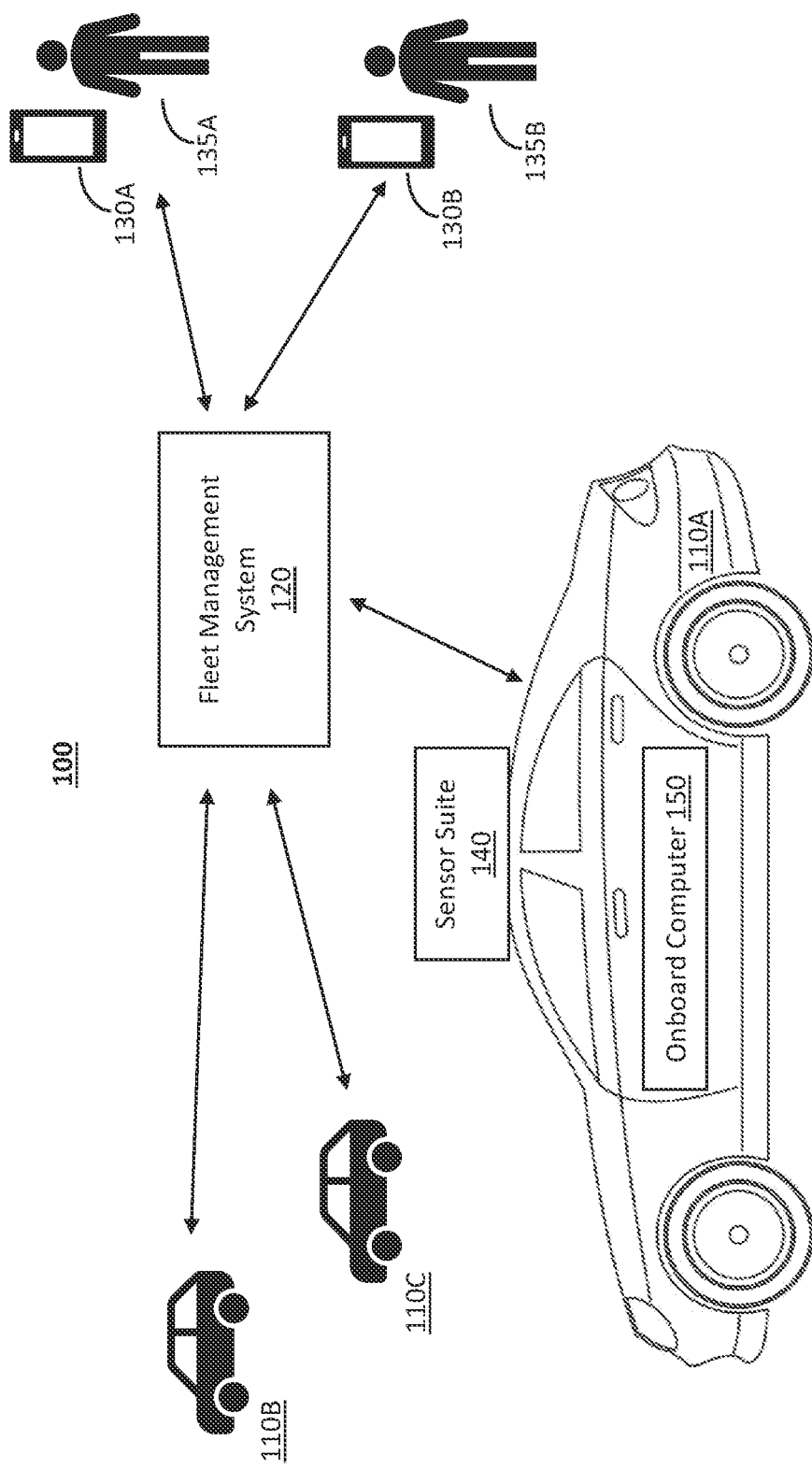
FIG. 1 illustrates a system including a fleet of AVs that can provide services to users, according to some embodiments of the present disclosure.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

AVs can provide driverless services, such as ride services, delivery services, and so on. A person can request an AV to pick him/her up from a location and drop him/her off at another location. With the autonomous driving features of the AV, the person does not have to drive during the ride and can be a passenger of the AV. The AV can navigate from the pick-up location to the drop-off location with no or little user input. AVs can provide other driverless services too, such as delivery service. A person can request an AV to deliver one or more items from one location to another location, and the person does not have to drive or be a passenger of the AV for the delivery.

AVs often need to drive near or through restricted traffic zones during their operations. A restricted traffic zone may be an area on the road with traffic restrictions or directives (e.g., lane closure, road closure, channelization, etc.) that are different from the normal traffic situations in the area. The traffic restrictions or directives can be different from maps using which the AVs operate. Thus, it is important for AVs to learn the traffic restrictions or directives in real time or near-real time for safety operations of the AVs. Navigating through restricted traffic zones usually requires AVs to map objects (e.g., traffic cones, posts, barriers, signs, flares, etc.) in the restricted traffic zones and understand related surrounding non-player characters (e.g., other vehicles).

Embodiments of the present disclosure provide a zone modeling platform that can use neural networks to model restricted traffic zones for navigating AVs. The navigation of an AV in an environment may be planned based on a model of a restricted traffic zone in the environment. The restricted traffic zone may be a construction zone, an accident zone, a blocked zone, or other types of zones where traffic is restricted, or the traffic derivative is different from normal. A map of the environment may be generated. The map may be a vector map. Tracks for one or more objects in the environment may also be generated. The tracks may include information describing attributes of the objects, such as classification, orientation, speed, shape, color, size, and so on. A temporal sequence of semantic grids of the restricted traffic zone may further be generated. The temporal sequence of semantic grids may include a plurality of semantic grids that represent a region in the environment and are arranged in a temporal sequence. Each semantic grid may represent the region at a respective time. The map, tracks, or temporal sequence of semantic grids may be generated based on sensor data of the AV or one or more other AVs.

The map, tracks, and temporal sequence of semantic grids may be input into a neural network. The neural network may include a convolutional neural network (CNN) and a graph neural network (GNN). The map and tracks may be input into the GNN, and the temporal sequence of semantic grids may be input into the CNN. In some embodiments, a query grid is also input into the CNN. The query grid may include a plurality of points, each point may represent a respective location in the environment. Output of one or more hidden layers of the GNN may be input into one or more hidden layers of the CNN, or vice versa.

The neural network may output edges of or within the restricted traffic zone. The neural network may also output a drivability grid that includes at least some of the points in the query grid and each point in the drivability grid is associated with information indicating drivability of the point. For instance, the information of a point may include a drivable probability that indicates a likelihood that the AV can drive to or at the point. The information of the point may also include the traffic direction at the location. The neural network may further combine the edges and the drivability grip to define one or more polylines that divide the restricted traffic zone into vectorized regions. The neural network may also output information indicating whether the AV can drive to or in each respective region. For a region that the AV can drive in or to, the neural network may also output information specifying a traffic direction of the region. The edges, drivability grid, vectorized regions, or some combination thereof can constitute a model of the restricted traffic zone and may be used for navigating the AV through the restricted traffic zone.

As will be appreciated by one skilled in the art, aspects of the present disclosure, in particular aspects of AV sensor calibration, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, or features are described below in connection with various example embodiments, these are merely examples used to simplify the present disclosure and are not intended to be limiting.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, or conditions, the phrase "between X and Y" represents a range that includes X and Y.

In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive or and not to an exclusive or.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

Example System with AV Fleet

FIG. 1 illustrates a system 100 including a fleet of AVs that can provide services to users, according to some embodiments of the present disclosure. The system 100 includes AVs 110A-110C (collectively referred to as "AVs 110" or "AV 110"), a fleet management system 120, and client devices 130A and 130B (collectively referred to as "client devices 130" or "client device 130"). The client devices 130A and 130B are associated with users 135A and 135B, respectively. The AV 110A includes a sensor suite 140 and an onboard computer 150. Even though not shown in FIG. 1, the AV 110B or 110C can also include a sensor suite 140 and an onboard computer 150. In other embodiments, the system 100 may include more, fewer, or different components. For example, the fleet of AVs 110 may include a different number of AVs 110 or a different number of client devices 130.

The fleet management system 120 manages the fleet of AVs 110. The fleet management system 120 may manage one or more services that the fleet of AVs 110 provides to the users 135. An example service is a ride service, e.g., an AV 110 provides a ride to a user 135 from a first location to a second location. Another example service is a delivery service, e.g., an AV 110 delivers one or more items from or to the user 135. The fleet management system 120 can select one or more AVs 110 (e.g., AV 110A) to perform a particular service, and instructs the selected AV to drive to one or more particular locations associated with the service (e.g., a first address to pick up user 135A, and a second address to pick up user 135B). The fleet management system 120 also manages fleet maintenance tasks, such as fueling, inspecting, and servicing of the AVs. As shown in FIG. 1, the AVs 110 communicate with the fleet management system 120. The AVs 110 and fleet management system 120 may connect over a network, such as the Internet.

In some embodiments, the fleet management system 120 receives service requests for the AVs 110 from the client devices 130. In an example, the user 135A accesses an app executing on the client device 130A and requests a ride from a pickup location (e.g., the current location of the client device 130A) to a destination location. The client device 130A transmits the ride request to the fleet management system 120. The fleet management system 120 selects an AV 110 from the fleet of AVs 110 and dispatches the selected AV 110A to the pickup location to carry out the ride request. In some embodiments, the ride request further includes a number of passengers in the group. In some embodiments, the ride request indicates whether a user 135 is interested in a shared ride with another user traveling in the same direction or along a same portion of a route. The ride request, or settings previously entered by the user 135, may further indicate whether the user 135 is interested in interaction with another passenger.

The fleet management system 120 may provide the AVs 110 information for navigating the AVs 110 during the operations of the AVs. For instance, the fleet management system 120 may provide maps (e.g., semantic maps, vector maps, etc.) of environments where AVs operate. The fleet management system 120 may also facilitate AVs to model restricted traffic zones for the AVs to safely navigate through or pass the restricted traffic zones. Certain aspects of the fleet management system 120 are described further in relation to FIG. 2.

A client device 130 is a device capable of communicating with the fleet management system 120, e.g., via one or more networks. The client device 130 can transmit data to the fleet management system 120 and receive data from the fleet management system 120. The client device 130 can also receive user input and provide outputs. In some embodiments, outputs of the client devices 130 are in human-perceptible forms, such as text, graphics, audio, video, and so on. The client device 130 may include various output components, such as monitors, speakers, headphones, projectors, and so on. The client device 130 may be a desktop or a laptop computer, a smartphone, a mobile telephone, a personal digital assistant (PDA), or another suitable device.

In some embodiments, a client device 130 executes an application allowing a user 135 of the client device 130 to interact with the fleet management system 120. For example, a client device 130 executes a browser application to enable interaction between the client device 130 and the fleet management system 120 via a network. In another embodiment, a client device 130 interacts with the fleet management system 120 through an application programming interface (API) running on a native operating system of the client device 130, such as IOS® or ANDROID™. The application may be provided and maintained by the fleet management system 120. The fleet management system 120 may also update the application and provide the update to the client device 130.

In some embodiments, a user 135 may submit service requests to the fleet management system 120 through a client device 130. A client device 130 may provide its user 135 a user interface (UI), through which the user 135 can make service requests, such as ride request (e.g., a request to pick up a person from a pickup location and drop off the person at a destination location), delivery request (e.g., a request to delivery one or more items from a location to another location), and so on. The UI may allow users 135 to provide locations (e.g., pickup location, destination location, etc.) or other information that would be needed by AVs 110 to provide services requested by the users 135.

The client device 130 may provide the user 135 an UI through which the user 135 can interact with the AV 110 that provides a ride to the user 135. The AV 110 may transmit one or more messages to the UI. The messages may be associated with one or more behaviors performed by the AV 110 for providing the ride to the user 135. The user 135 may view the messages in the UI. The UI may also allow the user 135 to interact with the messages. In some embodiments, the UI allows the user 135 to provide a comment or rate on the AV behaviors or the ride. The UI may also allow the user 135 to modify one or more settings of the ride in light of the AV behaviors.

The client device 130 may also provide the user 135 an UI through which the user 135 can interact with the fleet management system 120. For instance, the UI enables the user to submit a request for assistance to the fleet management system 120 through a network or a telephone service (e.g., a customer service hotline). The UI can further facilitate a communication between the user 135 and an agent of the fleet management system 120 who can provide the requested assistance. The UI may further enable the user to comment on or rate the agent.

The AV 110 is preferably a fully autonomous automobile, but may additionally or alternatively be any semi-autonomous or fully autonomous vehicle, e.g., a boat, an unmanned aerial vehicle, a driverless car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle. In some embodiments, some or all of the vehicle fleet managed by the fleet management system 120 are non-autonomous vehicles dispatched by the fleet management system 120, and the vehicles are driven by human drivers according to instructions provided by the fleet management system 120.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions, e.g., windshield wipers, headlights, turn indicators, air conditioning, etc.

The sensor suite 140 may include a computer vision ("CV") system, localization sensors, and driving sensors. For example, the sensor suite 140 may include interior and exterior cameras, RADAR sensors, sonar sensors, LIDAR sensors, thermal sensors, wheel speed sensors, inertial measurement units (IMUs), accelerometers, microphones, strain gauges, pressure monitors, barometers, thermometers, altimeters, ambient light sensors, etc. The sensors may be located in various positions in and around the AV 110. For example, the AV 110 may have multiple cameras located at different positions around the exterior and/or interior of the AV 110. Certain sensors of the sensor suite 140 are described further in relation to FIG. 3.

The onboard computer 150 is connected to the sensor suite 140 and functions to control the AV 110 and to process sensed data from the sensor suite 140 and/or other sensors to determine the state of the AV 110. Based upon the vehicle state and programmed instructions, the onboard computer 150 modifies or controls behavior of the AV 110. The onboard computer 150 may be preferably a general-purpose computer adapted for I/O communication with vehicle control systems and sensor suite 140, but may additionally or alternatively be any suitable computing device. The onboard computer 150 is preferably connected to the Internet via a wireless connection (e.g., via a cellular data connection). Additionally or alternatively, the onboard computer 150 may be coupled to any number of wireless or wired communication systems.

In some embodiments, the onboard computer 150 is in communication with the fleet management system 120, e.g., through a network. The onboard computer 150 may receive instructions from the fleet management system 120 and control behavior of the AV 110 based on the instructions. For example, the onboard computer 150 may receive from the fleet management system 120 an instruction for providing a ride to a user 135. The instruction may include information of the ride (e.g., pickup location, drop-off location, intermediate stops, etc.), information of the user 135 (e.g., identifying information of the user 135, contact information of the user 135, etc.). The onboard computer 150 may determine a navigation route of the AV 110 based on the instruction. As another example, the onboard computer 150 may receive from the fleet management system 120 a request for sensor data to be used by the ride evaluation platform. The onboard computer 150 may control one or more sensors of the sensor suite 140 to detect the user 135, the AV 110, or an environment surrounding the AV 110 based on the instruction and further provide the sensor data from the sensor suite 140 to the fleet management system 120. The onboard computer 150 may transmit other information requested by the fleet management system 120, such as perception of the AV 110 that is determined by a perception module of the onboard computer 150, historical data of the AV 110, and so on.

The onboard computer 150 supports a zone modeling platform to understand restricted traffic zones in environments where AVs 110 operates. The onboard computer 150 may obtain (e.g., generate or receive from one or more other AVs 110 or the fleet management system 120) information about a restricted traffic zone, e.g., a map of the restricted traffic zone, tracks of objects in the restricted traffic zone, a point grid, and so on. The information of the restricted traffic zone may be generated based on sensor data generated by the sensor suite 140 of one or more AVs that are or have operated in the environment. The onboard computer 150 may input the information of the restricted traffic zone into a trained model. The trained model may have a neural network architecture. In some embodiments, the trained model may have a CNN backbone and a GNN backbone, which may receive different inputs and generate different outputs. In some embodiments, the trained model can output edges within or of the restricted traffic zone, information regarding per-point drivability and traffic derivatives, vectorized regions in the restricted traffic zone, other information, or some combination thereof. The onboard computer 150 can use the output of the trained model to plan and control navigation of the AV 110 surrounding or within the restricted traffic zone. Certain aspects of the onboard computer 150 are described further in relation to FIG. 4.

Example Fleet Management System

Figure 2:
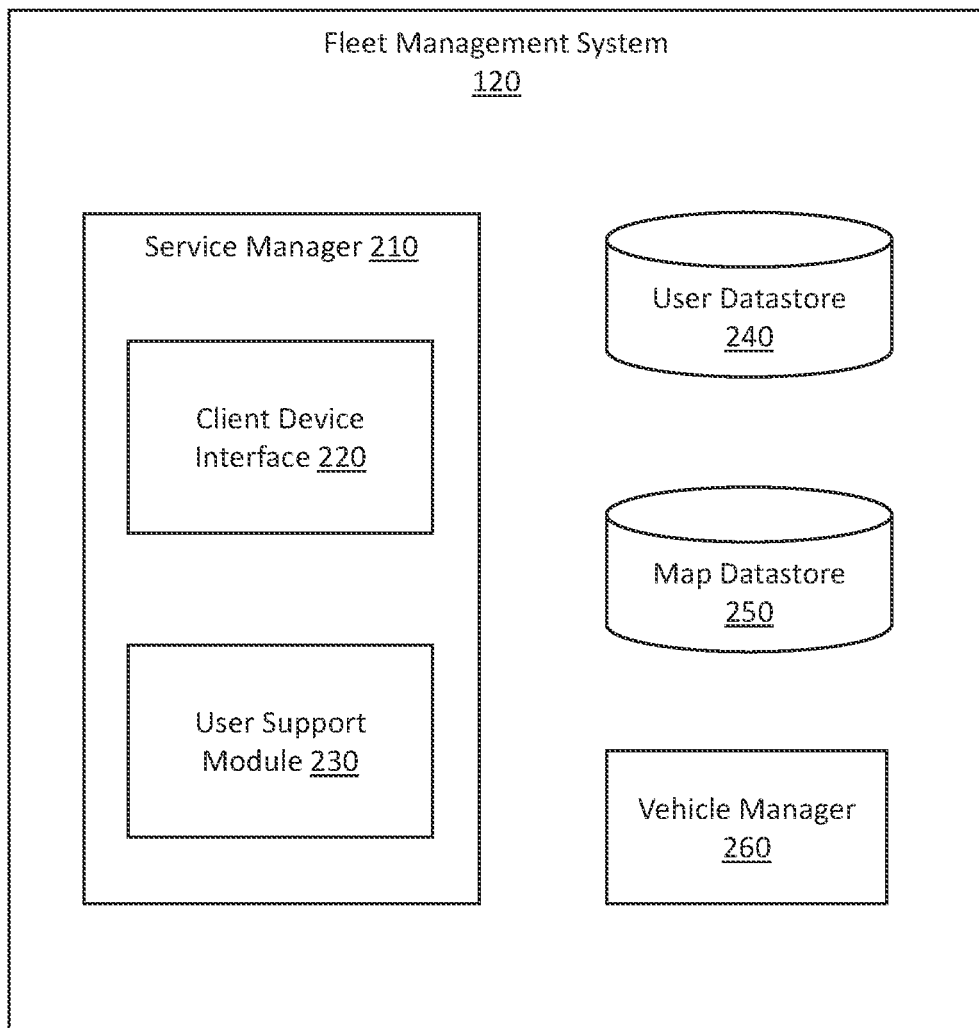
FIG. 2 is a block diagram showing a fleet management system, according to some embodiments of the present disclosure.

FIG. 2 is a block diagram showing the fleet management system, according to some embodiments of the present disclosure. The fleet management system 120 includes a service manager 210, a user datastore 240, a map datastore 250, and a vehicle manager 260. In alternative configurations, different and/or additional components may be included in the fleet management system 120. Further, functionality attributed to one component of the fleet management system 120 may be accomplished by a different component included in the fleet management system 120 or a different system than those illustrated, such as the onboard computer 150.

The service manager 210 manages services that the fleet of AVs 110 can provide. The service manager 210 includes a client device interface 220 and a user support module 230. The client device interface 220 provides interfaces to client devices, such as headsets, smartphones, tablets, computers, and so on. For example, the client device interface 220 may provide one or more apps or browser-based interfaces that can be accessed by users, such as the users 135, using client devices, such as the client devices 130. The client device interface 220 enables the users to submit requests to a ride service provided or enabled by the fleet management system 120. In particular, the client device interface 220 enables a user to submit a ride request that includes an origin (or pickup) location and a destination (or drop-off) location. The ride request may include additional information, such as a number of passengers traveling with the user, and whether or not the user is interested in a shared ride with one or more other passengers not known to the user.

The client device interface 220 can also enable users to select ride settings. The client device interface 220 can provide one or more options for the user to engage in a virtual environment, such as whether to interact with another person, whether to involve in an entertainment activity, and so on. The client device interface 220 may enable a user to opt-in to some, all, or none of the virtual activities offered by the ride service provider. The client device interface 220 may further enable the user to opt-in to certain monitoring features, e.g., to opt-in to have the interior sensors 340 obtain sensor data of the user. The client device interface 220 may explain how this data is used by the service manager 210 (e.g., for providing support to the user, etc.) and may enable users to selectively opt-in to certain monitoring features, or to opt-out of all of the monitoring features. In some embodiments, the user support platform may provide a modified version of a virtual activity if a user has opted out of some or all of the monitoring features.

The user support module 230 may receive support requests from passengers of AVs through the client device interface 220 or the onboard computer 150. The user support module 230 manages the support requests. In some embodiments, the user support module 230 maintains a queue of pending support requests, in which the pending support requests may be arranged in an order. A pending support request is a support request that has not been completed. A support request may be considered completed after the support requested by the passenger has been provided or the issue that triggered the support request has been resolved.

The user support module 230 may assign the pending support requests to agents based on the order in the queue. The agent can interact with the passenger and provide support to the passenger. An agent may be associated with a device in communication with the user support module 230. The device may be a desktop or a laptop computer, a smartphone, a mobile telephone, a PDA, or another suitable device. The user support module 230 may send information related to support requests assigned to the agent to the agent's device. The information may include the support requests and guidance on how to provide the requested support.

In some embodiments, the user support module 230 determines a state (e.g., a sentiment) of a passenger who submitted a support request and processes the support request based on the passenger's state. The user support module 230 may determine the passenger's state based on data of the passenger, data of the AV, data of one or more objects in an environment surrounding the passenger or AV, or some combination thereof. The data may include sensor data generated by the sensor suite 140 from detecting the passenger, AV, one or more objects in the environment, or some combination thereof. For instance, the user support module 230 may interface with AVs 110 (e.g., with onboard computers of the AVs 110) and receive sensor data from the AVs 110. The sensor data may be camera images, captured sound, measured temperature, other outputs from the sensor suite 140, or some combination thereof. The data may also include data retrieved by the user support module 230 from the user datastore 240 or map datastore 250. In an embodiment, the user support module 230 may provide the data to a trained model and the train model analyzes the sentiment of the passenger. The trained model may classify the passenger's sentiment. Example categories include negative (e.g., anxious, angry, etc.), neural (e.g., calm), positive (e.g., confident, happy, etc.), and so on. The trained model may also estimate a degree of the passenger's sentiment, such as an anxiety level or anger level.

The user support module 230 may assign the support request to an agent based on the passenger's state. For instance, based on a determination that the passenger is anxious, the user support module 230 may assign the support request to a currently available agent or the next available agent so that the waiting time of the passenger can be minimized. The agent, who receives the support request, can help the passenger to deal with the issue. The agent may communicate with the passenger, e.g., through an audio or video call.

The user datastore 240 stores ride information associated with users of the ride service, e.g., the users 135. In some embodiments, the user datastore 240 stores user sentiments associated with rides taken by the user 135. The user sentiments may be determined by the user support module 230. The user datastore 240 may store an origin location and a destination location for a user's current ride. The user datastore 240 may also store historical ride data for a user, including origin and destination locations, dates, and times of previous rides taken by a user. The historical data of the user may also include information associated with historical support requests made by the user during the previous rides, such as sensor data associated with the historical support requests, communications of the user with agents that serviced the historical support requests, states of the user during the communications, information of AVs 110 associated with the historical support requests, and so on. The historical data of the user may also include information associated with communications of AVs with the user for AV behaviors in historical rides taken by the user. In some cases, the user datastore 240 may further store future ride data, e.g., origin and destination locations, dates, and times of planned rides that a user has scheduled with the ride service provided by the AVs 110 and fleet management system 120. Some or all of the data of a user in the user datastore 240 may be received through the client device interface 220, an onboard computer (e.g., the onboard computer 150), a sensor suite of AVs 110 (e.g., the sensor suite 140), a third-party system associated with the user and the fleet management system 120, or other systems or devices.

In some embodiments, the user datastore 240 also stores data indicating user preferences associated with rides in AVs. The fleet management system 120 may include one or more learning modules (not shown in FIG. 2) to learn user interests based on user data. For example, a learning module may compare locations in the user datastore 240 with map datastore 250 to identify places the user has visited or plans to visit. For example, the learning module may compare an origin or destination address for a user in the user datastore 240 to an entry in the map datastore 250 that describes a building at that address. The map datastore 250 may indicate a building type, e.g., to determine that the user was picked up or dropped off at an event center, a restaurant, or a movie theater. In some embodiments, the learning module may further compare a date of the ride to event data from another data source (e.g., a third-party event data source, or a third-party movie data source) to identify a more particular interest, e.g., to identify a performer who performed at the event center on the day that the user was picked up from an event center, or to identify a movie that started shortly after the user was dropped off at a movie theater. This interest (e.g., the performer or movie) may be added to the user datastore 240. As another example, a learning module may learn user tolerance or preference for AV behaviors, e.g., based on information associated with communications of AVs with the user for AV behaviors in historical rides taken by the user. The learning module may learn that the user has a high tolerance for an AV behavior based on information indicating that the user had no bad feelings for the AV behavior undesirable in one or more previous rides. Similarly, the learning module may learn that the user has a low tolerance for a type of AV behavior based on information indicating that the user had negative sentiments towards the AV behavior in one or more previous rides.

The map datastore 250 stores one or more maps of environments through which the AVs 110 may travel. A map may be a semantic map or vector map. The map datastore 250 includes data describing roadways, such as e.g., locations of roadways, connections between roadways, roadway names, speed limits, traffic flow regulations, toll information, etc. The map datastore 250 may further include data describing buildings (e.g., locations of buildings, building geometry, building types), and data describing other objects (e.g., location, geometry, object type) that may be in the environments of AV 110. The map datastore 250 may also include data describing other features, such as bike lanes, sidewalks, crosswalks, traffic lights, parking lots, signs, billboards, etc.

Some of the map datastore 250 may be gathered by the fleet of AVs 110. For example, images obtained by the exterior sensors 310 of the AVs 110 may be used to learn information about the AVs' environments. As one example, AVs may capture images in a residential neighborhood during a Christmas season, and the images may be processed to identify which homes have Christmas decorations. The images may be processed to identify particular features in the environment. For the Christmas decoration example, such features may include light color, light design (e.g., lights on trees, roof icicles, etc.), types of blow-up figures, etc. The fleet management system 120 and/or AVs 110 may have one or more image processing modules to identify features in the captured images or other sensor data. This feature data may be stored in the map datastore 250. In some embodiments, certain feature data (e.g., seasonal data, such as Christmas decorations, or other features that are expected to be temporary) may expire after a certain period of time. In some embodiments, data captured by a second AV 110 may indicate that a previously-observed feature is no longer present (e.g., a blow-up Santa has been removed) and in response, the fleet management system 120 may remove this feature from the map datastore 250.

The vehicle manager 260 manages and communicates with the fleet of AVs 110. The vehicle manager 260 assigns the AVs 110 to various tasks and directs the movements of the Vs 110 in the fleet. In some embodiments, the vehicle manager 260 includes additional functionalities not specifically shown in FIG. 2. For example, the vehicle manager 260 instructs AVs 110 to drive to other locations while not servicing a user, e.g., to improve geographic distribution of the fleet, to anticipate demand at particular locations, etc. The vehicle manager 260 may also instruct AVs 110 to return to an AV 110 facility for fueling, inspection, maintenance, or storage. As another example, the vehicle manager 260 may include functionalities of the onboard computer 150, such as functionalities related to modeling restricted traffic zones.

In some embodiments, the vehicle manager 260 selects AVs from the fleet to perform various tasks and instructs the AVs to perform the tasks. For example, the vehicle manager 260 receives a ride request from the client device interface 220. The vehicle manager 260 selects an AV 110 to service the ride request based on the information provided in the ride request, e.g., the origin and destination locations. If multiple AVs 110 in the AV 110 fleet are suitable for servicing the ride request, the vehicle manager 260 may match users for shared rides based on an expected compatibility. For example, the vehicle manager 260 may match users with similar user interests, e.g., as indicated by the user datastore 240. In some embodiments, the vehicle manager 260 may match users for shared rides based on previously-observed compatibility or incompatibility when the users had previously shared a ride.

The vehicle manager 260 or another system may maintain or access data describing each of the AVs in the fleet of AVs 110, including current location, service status (e.g., whether the AV 110 is available or performing a service; when the AV 110 is expected to become available; whether the AV 110 is schedule for future service), fuel or battery level, etc. The vehicle manager 260 may select AVs for service in a manner that optimizes one or more additional factors, including fleet distribution, fleet utilization, and energy consumption. The vehicle manager 260 may interface with one or more predictive algorithms that project future service requests and/or vehicle use, and select vehicles for services based on the projections.

The vehicle manager 260 transmits instructions dispatching the selected AVs. In particular, the vehicle manager 260 instructs a selected AV 110 to drive autonomously to a pickup location in the ride request and to pick up the user and, in some cases, to drive autonomously to a second pickup location in a second ride request to pick up a second user. The first and second user may jointly participate in a virtual activity, e.g., a cooperative game or a conversation. The vehicle manager 260 may dispatch the same AV 110 to pick up additional users at their pickup locations, e.g., the AV 110 may simultaneously provide rides to three, four, or more users. The vehicle manager 260 further instructs the AV 110 to drive autonomously to the respective destination locations of the users.

Example Sensor Suite

Figure 3:
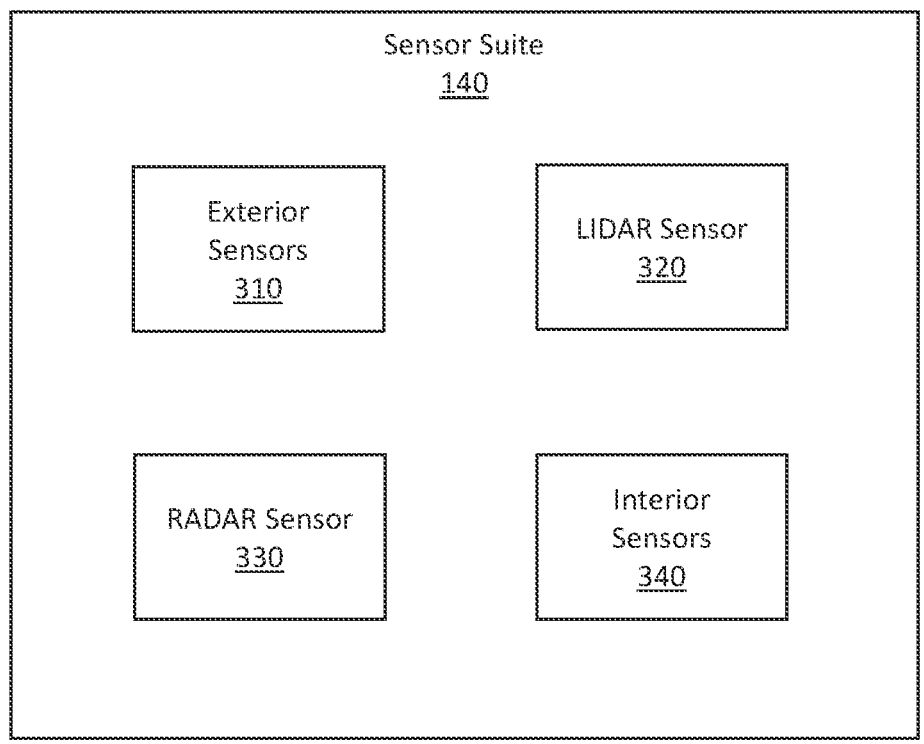
FIG. 3 is a block diagram showing a sensor suite, according to some embodiments of the present disclosure.

FIG. 3 is a block diagram showing the sensor suite 140, according to some embodiments of the present disclosure.

The sensor suite 140 may be an onboard sensor suite of an AV, e.g., AV 110 in FIG. 1. The sensor suite 140 includes exterior sensors 310, a LIDAR sensor 320, a RADAR sensor 330, and interior sensors 340. The sensor suite 140 may include any number of the types of sensors shown in FIG. 3, e.g., one or more LIDAR sensors 320, one or more RADAR sensors 330, etc. The sensor suite 140 may have more types of sensors than those shown in FIG. 3, such as the sensors described with respect to FIG. 1. In other embodiments, the sensor suite 140 may not include one or more of the sensors shown in FIG. 3.

The exterior sensors 310 may detect objects in an environment around the AV. The environment may include a scene in which the AV operates. Example objects include objects related to weather (e.g., fog, rain, snow, haze, etc.), persons, buildings, traffic cones, traffic lights, traffic signs, barriers, vehicles, street signs, trees, plants, animals, or other types of objects that may be present in the environment around the AV. In some embodiments, the exterior sensors 310 include exterior cameras having different views, e.g., a front-facing camera, a back-facing camera, and side-facing cameras. One or more exterior sensors 310 may be implemented using a high-resolution imager with a fixed mounting and field of view. One or more exterior sensors 310 may have adjustable field of views and/or adjustable zooms.

In some embodiments, the exterior sensors 310 may operate continually during operation of the AV. In an example embodiment, the exterior sensors 310 capture sensor data (e.g., images, etc.) of a scene in which the AV drives. In other embodiment, the exterior sensors 310 may operate in accordance with an instruction from the onboard computer 150 or an external system, such as the vehicle manager 260 of the fleet management system 120. For instance, the onboard computer 150 or external system may request the exterior sensors 310 to detect restricted traffic zones and to generate sensor data that can be used for modeling the restricted traffic zones. Some of all of the exterior sensors 310 may capture sensor data of one or more objects in an environment surrounding the AV based on the instruction.

The LIDAR sensor 320 may measure distances to objects in the vicinity of the AV using reflected laser light. The LIDAR sensor 320 may be a scanning LIDAR that provides a point cloud of the region scanned. The LIDAR sensor 320 may have a fixed field of view or a dynamically configurable field of view. The LIDAR sensor 320 may produce a point cloud that describes, among other things, distances to various objects in the environment of the AV.

The RADAR sensor 330 may measure ranges and speeds of objects in the vicinity of the AV using reflected radio waves. The RADAR sensor 330 may be implemented using a scanning RADAR with a fixed field of view or a dynamically configurable field of view. The RADAR sensor 330 may include one or more articulating RADAR sensors, long-range RADAR sensors, short-range RADAR sensors, or some combination thereof.

The interior sensors 340 may detect the interior of the AV, such as objects inside the AV. Example objects inside the AV include passengers, client devices of passengers, components of the AV, items delivered by the AV, items facilitating services provided by the AV, and so on. The interior sensors 340 may include multiple interior cameras to capture different views, e.g., to capture views of an object inside the AV. The interior sensors 340 may be implemented with a fixed mounting and fixed field of view, or the interior sensors 340 may have adjustable field of views and/or adjustable zooms, e.g., to focus on one or more interior features of the AV. The interior sensors 340 may transmit sensor data to a perception module (such as the perception module 430 described below in conjunction with FIG. 4), which can use the sensor data to classify a feature and/or to determine a status of a feature.

In some embodiments, the interior sensors 340 include one or more input sensors that allow passengers to provide input. For instance, a passenger may use an input sensor to provide feedback on AV behaviors during the ride. The input sensors may include touch screen, microphone, keyboard, mouse, or other types of input devices. In an example, the interior sensors 340 include a touch screen that is controlled by the onboard computer 150. The onboard computer 150 may present messages on the touch screen and receive interaction of the passenger with the messages through the touch screen. A message may include information of one or more undesirable AV behaviors in the ride. In some embodiments, some or all of the interior sensors 340 may operate continually during operation of the AV. In other embodiment, some or all of the interior sensors 340 may operate in accordance with an instruction from the onboard computer 150 or an external system, such as the fleet management system 120.

Example Onboard Computer

Figure 4:
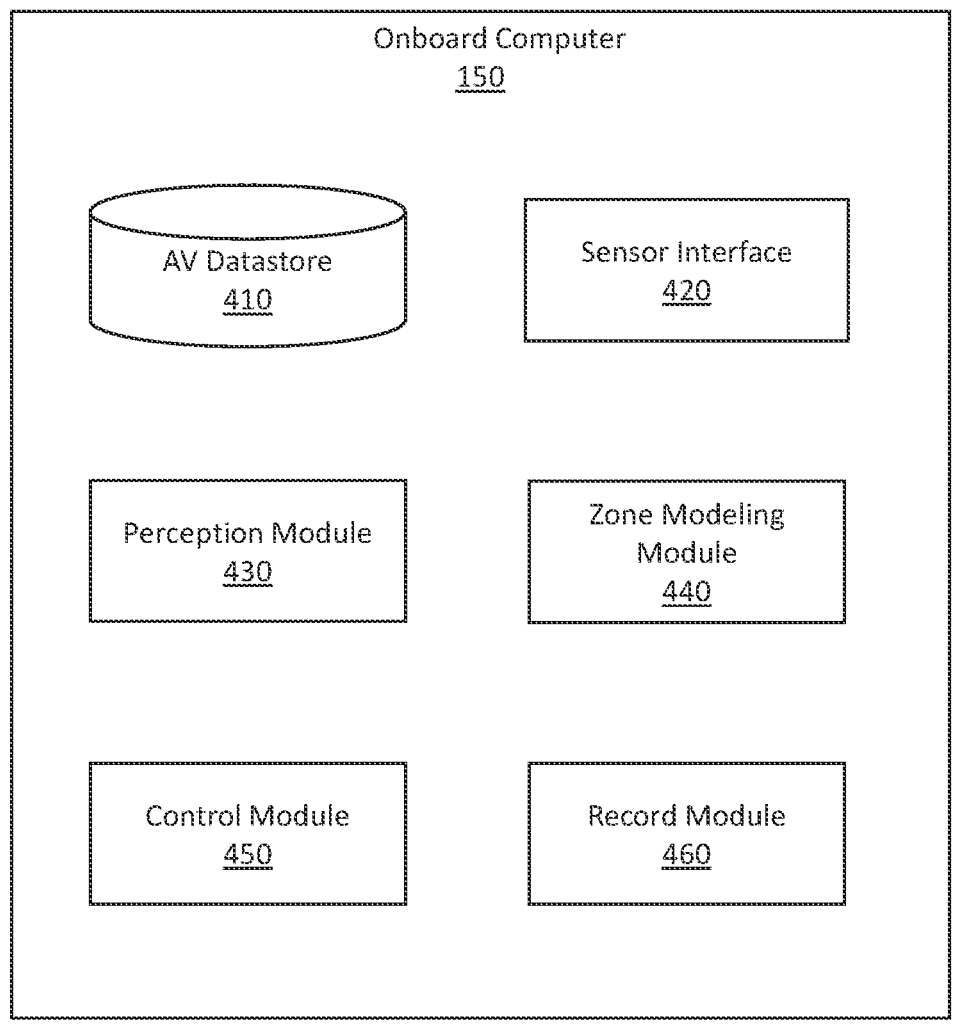
FIG. 4 is a block diagram showing an onboard computer, according to some embodiments of the present disclosure.

FIG. 4 is a block diagram showing the onboard computer 150 according to some embodiments of the present disclosure. The onboard computer 150 may control an AV, e.g., AV 110 in FIG. 1. As shown in FIG. 4, the onboard computer 150 includes an AV datastore 410, a sensor interface 420, a perception module 430, a zone modeling module 440, a control module 450, and a record module 460. In alternative configurations, fewer, different and/or additional components may be included in the onboard computer 150. For example, components and modules for conducting route planning, controlling movements of the AV, and other vehicle functions are not shown in FIG. 4. Further, functionality attributed to one component of the onboard computer 150 may be accomplished by a different component included in the onboard computer 150 or a different system, such as the fleet management system 120.

The AV datastore 410 stores data associated with operations of the AV. The AV datastore 410 may store one or more operation records of the AV. An operation record is a record of an operation of the AV, e.g., an operation for providing a ride service. The operation may be a currently performed operation or a previously performed operation ("previous operation" or "historical operation"). The operation record may include information indicating operational behaviors of the AV during the operation. The operational behaviors may include sensor detection, movement, stop, battery charging, calibration, maintenance, communication with the fleet management system 120, communication with assistance agent, communication with user, communication with another AV, and so on. The operations record may also include data used, received, or captured by the AV during the operation, such as map data, instructions from the fleet management system 120, sensor data captured by the AV's sensor suite, and so on. In some embodiments, the AV datastore 410 stores a detailed map that includes a current environment of the AV. The AV datastore 410 may store data in the map datastore 250. In some embodiments, the AV datastore 410 stores a subset of the map datastore 250, e.g., map data for a city or region in which the AV is located.

The data in the AV datastore 410 may include data generated by the AV itself. The data may include sensor data capturing one or more environments where the AV operates, e.g., operates to provide services. The sensor data may be from the sensor suite 140 of the AV. The data in the AV datastore 410 may also include perception data that identifies one or more environmental conditions. The perfection data may be from the perception module 430 of the onboard computer 150 of the AV. The data may also include external data, e.g., data from other AVs or systems. For example, the data in the AV datastore 410 may include data (e.g., sensor data, perception, etc.) from one or more other AVs that capture one or more environments where the other AVs operate. As another example, the data in the AV datastore 410 may include data from the fleet management system 120, e.g., data about environmental conditions, instructions (e.g., operational plans) from the vehicle manager 260, etc. In yet another example, the data in the AV datastore 410 may include data from one or more third-party systems that provide information of environments where the AV operates. The AV may be in communication with the one or more third-party systems, e.g., through a network.

The sensor interface 420 interfaces with the sensors in the sensor suite 140. The sensor interface 420 may request data from the sensor suite 140, e.g., by requesting that a sensor capture data in a particular direction or at a particular time. For example, the sensor interface 420 instructs the sensor suite 140 to capture sensor data of an environment surrounding the AV, e.g., by sending a request for sensor data to the sensor suite 140. In some embodiments, the request for sensor data may specify which sensor(s) in the sensor suite 140 to provide the sensor data, and the sensor interface 420 may request the sensor(s) to capture data. The request may further provide one or more settings of a sensor, such as orientation, resolution, accuracy, focal length, and so on. The sensor interface 420 can request the sensor to capture data in accordance with the one or more settings.

A request for sensor data may be a request for real-time sensor data, and the sensor interface 420 can instruct the sensor suite 140 to immediately capture the sensor data and to immediately send the sensor data to the sensor interface 420. The sensor interface 420 is configured to receive data captured by sensors of the sensor suite 140, including data from exterior sensors mounted to the outside of the AV, and data from interior sensors mounted in the passenger compartment of the AV. The sensor interface 420 may have subcomponents for interfacing with individual sensors or groups of sensors of the sensor suite 140, such as a camera interface, a LIDAR interface, a RADAR interface, a microphone interface, etc.

The perception module 430 identifies objects and/or other features captured by the sensors of the AV. The perception module 430 may identify objects inside the AV based on sensor data captured by one or more interior sensors (e.g., the interior sensors 340). For instance, the perception module 430 may identify one or more passengers in the AV. In some embodiments, the perception module 430 identifies objects in the environment of the AV and captured by one or more sensors (e.g., the exterior sensors 310, LIDAR sensor 320, RADAR sensor 330, etc.). As another example, the perception module 430 determines one or more environmental conditions based on sensor data from one or more sensors (e.g., the exterior sensors 310, LIDAR sensor 320, RADAR sensor 330, etc.).

The perception module 430 may include one or more classifiers trained using machine learning to identify particular objects. For example, a multi-class classifier may be used to classify each object in the AV or in the environment of the AV as one of a set of potential objects, e.g., a passenger, a vehicle, a pedestrian, or a cyclist. As another example, a passenger classifier recognizes passengers in the AV, a pedestrian classifier recognizes pedestrians in the environment of the AV, a vehicle classifier recognizes vehicles in the environment of the AV, etc. The perception module 430 may identify facial expressions of people, such as passengers, e.g., based on data from interior cameras. The perception module 430 may identify travel speeds of identified objects based on data from the RADAR sensor 330, e.g., speeds at which other vehicles, pedestrians, or birds are traveling. As another example, the perception module 43—may identify distances to identified objects based on data (e.g., a captured point cloud) from the LIDAR sensor 320, e.g., a distance to a particular vehicle, building, or other feature identified by the perception module 430. The perception module 430 may also identify other features or characteristics of objects in the environment of the AV based on image data or other sensor data, e.g., colors (e.g., the colors of Christmas lights), sizes (e.g., heights of people or buildings in the environment), makes and models of vehicles, pictures and/or words on billboards, etc.

In some embodiments, the perception module 430 fuses data from one or more interior sensors 340 with data from exterior sensors (e.g., exterior sensors 310) and/or AV datastore 410 to identify environmental objects that one or more users are looking at. The perception module 430 determines, based on an image of a user, a direction in which the user is looking, e.g., a vector extending from the user and out of the AV in a particular direction. The perception module 430 compares this vector to data describing features in the environment of the AV, including the features' relative location to the AV (e.g., based on real-time data from exterior sensors and/or the AV's real-time location) to identify a feature in the environment that the user is looking at.

While a single perception module 430 is shown in FIG. 4, in some embodiments, the onboard computer 150 may have multiple perception modules, e.g., different perception modules for performing different ones of the perception tasks described above (e.g., object perception, speed perception, distance perception, feature perception, facial recognition, mood determination, sound analysis, gaze determination, etc.).

The zone modeling module 440 uses neural networks to model restricted traffic zones that AVs need to drive through. The zone model module 440 may obtain information of a restricted traffic zone and generate an input dataset that can be input into a neural network. The input dataset may include one or more maps of the restricted traffic zone, tracks of one or more objects in the restricted traffic zone, one or more temporal sequences of semantic grids associated with the restricted traffic zone, one or more query grids associated with the restricted traffic zone, other information of the restricted traffic zone, or some combination thereof. A map of the restricted traffic zone may show features representing objects in the restricted traffic zone, such as traffic lanes, regions, vehicles, buildings, persons, trees, signs, traffic cones, and so on. The map may also include information associated with the features, such as classification, shape, size, orientation, location, material, or other attributes of the objects represented by the features. Tracks of an object may include historical information or present information of the object, such as classification, trajectory history, shape, size, kinematics, orientation, location, material, and so on. A temporal sequence of semantic grids includes semantic grids representing a region in the restricted traffic zone at different times. A semantic grid may indicate whether the region is occupied (or occupied by what) at the time. A query grid may include points representing locations sampled from the restricted traffic zone.

The zone modeling module 440 may generate the input dataset based on data from the AV datastore 410, sensor interface 420, perception module 430, fleet management system 120, one or more other AVs, other systems or devices, or some combination thereof. The zone modeling module 440 may deploy a neural network to model the restricted traffic zone based on the input dataset. The neural network receives the input dataset and outputs one or more models of the restricted traffic zone. For instance, the neural network may output one or more edges associated with the restricted traffic zone, one or more drivability grids, one or more vectorized regions, or some combination thereof. An edge associated with the restricted traffic zone may be an edge of the restricted traffic zone or an edge of a region in the restricted traffic zone. A drivability grid may correspond to a query grid and includes information indicating drivability at each point in the query grid. For instance, the neural network may determine a drivable probability for each point, the drivable probability indicates whether the AV can drive to or at the point. The drivability grid may also include one or more traffic derivatives (e.g., traffic direction, preferred speed, etc.) at each point. A vectorized region may represent a region in the restricted traffic zone and may be associated with information indicating drivability or traffic derivative(s) within the region.

The zone modeling module 440 can use the output(s) of the neural network to control the AV to drive through or pass the restricted traffic zone. The zone modeling module 440 may provide the output(s) of the neural network to the control module 450 for the control module 450 to plan and control the driving of the AV surrounding or in the restricted traffic zone. Certain aspects of the zone modeling module 440 are provided below in conjunction with FIG. 5.

The control module 450 controls operations of the AV, e.g., based on information from the sensor interface 420 or the perception module 430. In some embodiments, the control module 450 controls operation of the AV by using a trained model, such as a trained neural network. The control module 450 may provide input data to the control model, and the control model outputs operation parameters for the AV. The input data may include models of restricted traffic zones from the zone modeling module 440, sensor data from the sensor interface 420 (which may indicate a current state of the AV), objects identified by the perception module 430, data from the fleet management system, other data, or some combination thereof. The operation parameters are parameters indicating operation to be performed by the AV. The operation of the AV may include perception, prediction, planning, localization, motion, navigation, other types of operation, or some combination thereof.

The control module 450 may provide instructions to various components of the AV based on the output of the control model, and these components of the AV will operate in accordance with the instructions. In an example where the output of the control model indicates that a change of traveling speed of the AV is required given a prediction of traffic condition, the control module 450 may instruct the motor of the AV to change the traveling speed of the AV. In another example where the output of the control model indicates a need to detect characteristics of an object in the environment around the AV (e.g., detect a speed limit), the control module 450 may instruct the sensor suite 140 to capture an image of the speed limit sign with sufficient resolution to read the speed limit and instruct the perception module 430 to identify the speed limit in the image.

The record module 460 generates operation records of the AV and stores the operations records in the AV datastore 410. The record module 460 may generate an operation record in accordance with an instruction from the fleet management system 120, e.g., the vehicle manager 260. The instruction may specify data to be included in the operation record. The record module 460 may determine one or more timestamps for an operation record. In an example of an operation record for a ride service, the record module 460 may generate timestamps indicating the time when the ride service starts, the time when the ride service ends, times of specific AV behaviors associated with the ride service, and so on. The record module 460 can transmit the operation record to the fleet management system 120.

Figure 5:
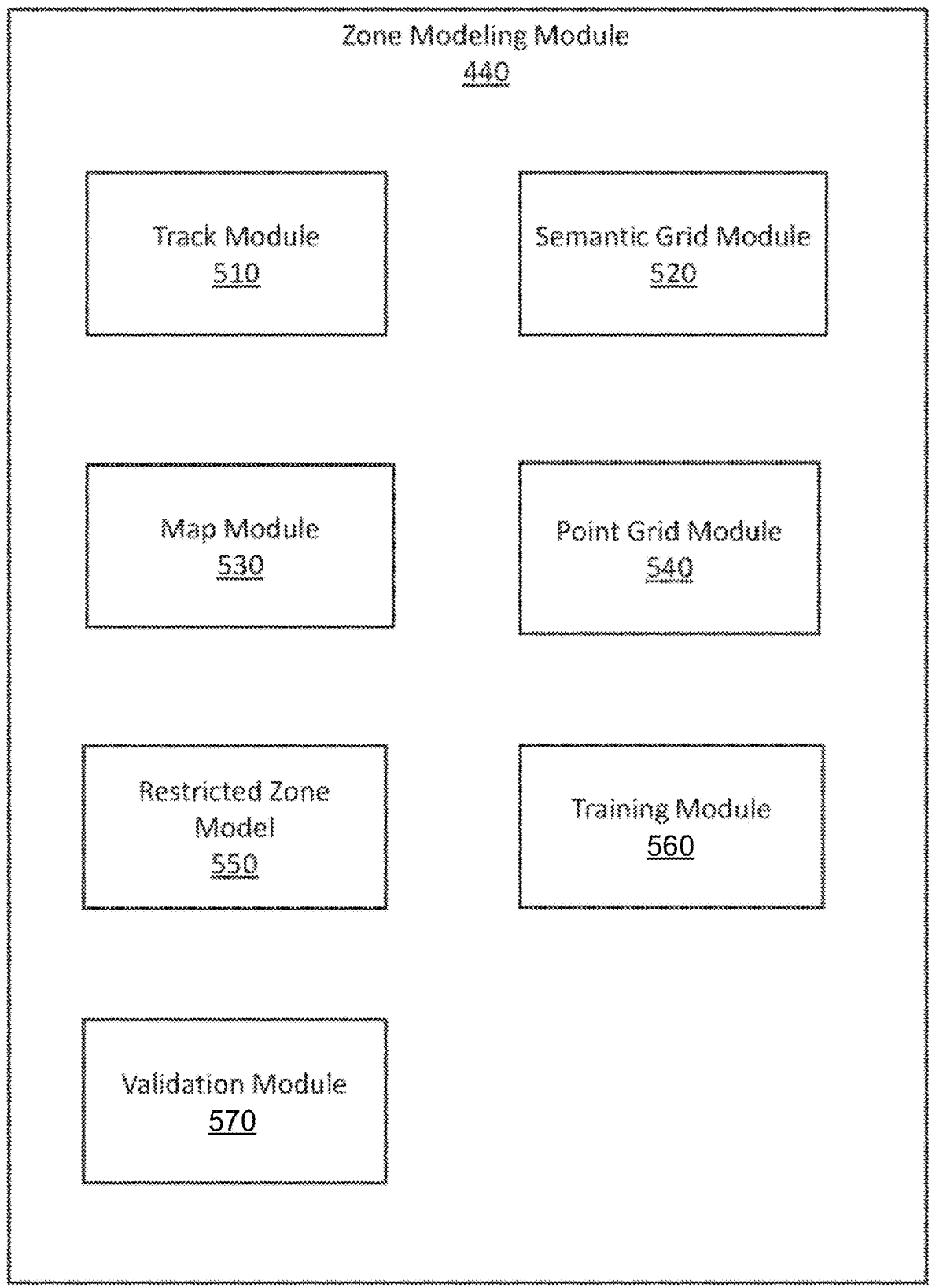
FIG. 5 is a block diagram showing a zone modeling module, according to some embodiments of the present disclosure.

FIG. 5 is a block diagram showing the zone modeling module 440, according to some embodiments of the present disclosure. As described above, the zone modeling module 440 can model an environment including a restricted traffic zone by using a neural network. The zone modeling module 440 includes a track module 510, a semantic grid module 520, a map module 530, a point grid module 540, a restricted zone model 550, a training module 560, and a validation module 570. In alternative configurations, different and/or additional components may be included in the zone modeling module 440. For example, the zone modeling module 440 may not include the training module 560 or validation module 570. Further, functionality attributed to one component of the zone modeling module 440 may be accomplished by a different component included in the zone modeling module 440, a different component included in the onboard computer 150, or a different system (such as the fleet management system 120).

The track module 510 generates tracks of one or more objects in the environment. Examples of the objects include vehicles, construction objects, signs, persons, trees, buildings, and so on. The objects in the environment may be detected by the AV or one or more other AVs. The track module 510 may generate the tracks based on AV sensor data. In some embodiments, tracks of an object may include information of the object, such as classification, trajectory history, shape, size, kinematics, orientation, location, material, and so on. The information of the object may be historical dynamic information or static context information.

The semantic grid module 520 generates one or more temporal sequences of semantic grids for the environment. In some embodiments, the semantic grid module 520 may identify one or more regions in the environment and generate a temporal sequence of semantic grids for each respective region. The semantic grids in a temporal sequence may represent a region at various times. Each semantic grid may be associated with a respective time stamp and include information associated with the region at a time corresponding to the time stamp. The information may include the shape, size, or location of the region. The information may also include information indicating whether the region is occupied. The semantic grids may be arranged in a sequence based on their timestamps. In some embodiments, temporal sequences of semantic grids may be used to detect regions where individual instances are different to identify or track, such as regions where construction materials or debris are piled up.

The map module 530 generates one or more maps for the environment. A map may be a semantic map, which may be represented in a vector map. The vector map may include points, lines, polygons, or one or more other elements, which collectively make up features on the map. A feature in the vector map may be associated with information of one or more objects represented by the feature, such as classification, shape, size, orientation, location, material, or other attributes of the object(s). Examples of the features in the vector map may include lanes, regions, vehicles, buildings, persons, trees, signs, traffic cones, and so on.

In some embodiments, the map module 530 may generate a map based on information from the sensor interface 420, the perception module 430, or one or more other AVs. Additionally or alternatively, the map module 530 may receive a map from the fleet management system 120, e.g., a map stored in the map datastore 250. In some embodiments, the map module 530 may generate a new map based on a map from the fleet management system 120, e.g., by modifying the map from the fleet management system 120 with information from the sensor interface 420, the perception module 430, or one or more other AVs.

The point grid module 540 generates one or more point grids for the environment. A point grid includes a plurality of points. Each point may represent a respective location in the environment and may be used by the restricted zone model 550 for predicting drivability. A point grid may be a structured point grid or unstructured point grid. In some embodiments, a point grid may be a bird's eye view of at least part of the environment. The point grid module 540 may generate a point grid by a region-of-interest sample. The point grid module 540 may identify a region-of-interest, which may be at least part of the restricted traffic zone. The point grid module 540 may further select locations within the region-of-interest. The point grid module 540 may select locations based on a sampling rate. For example, the point grid module 540 may select a location for every unit area. The unit area may have a predetermined size. The point grid module 540 may generate a point for each selected location, and the points of all the selection locations may constitute a point grid.

Different sampling techniques can be used for the training or inference process of the restricted zone model 550. For example, during the training process of the restricted zone model 550, a dense grid may be sampled based on the map due to less computation constraints in training; while during an inference process, a sparse grid may be sampled based on the planned routes or trajectories to reduce computation. A sampler can create either a structured or unstructured grid. Structured grids can simplify certain computations but may require more memory. Unstructured grids can be generated using adaptive sampling strategies that adjust the density in areas near potential boundaries. A point grid generated by the point grid module 540 may be referred to as a query grid, the drivability at each point is to be determined, e.g., by the restricted zone model 550.

The restricted zone model 550 is a trained model that can be used to model the environment based on information generated by the track module 510, semantic grid module 520, map module 530, point grid module 540, or some combination thereof. The restricted zone model 550 may have a neural network architecture. The restricted zone model 550 may include one or more input layers, one or more hidden layers, and one or more output layers. In some embodiments, the restricted zone model 550 may include multiple backbones, such as a CNN backbone and a GNN backbone. The backbones may receive different inputs. For instance, the CNN backbone may receive temporal sequences of semantic grids and point grids, while the GNN backbone may receive vector maps and tracks. In other embodiments, a backbone may receive a different input. An output of a hidden layer or the output layer of the GNN backbone may be used as input to a hidden layer of the CNN. In some embodiments, the restricted zone model 550 may include a layer that receives the outputs of the backbones (e.g., from the output layers of the backbones) and generates an output of the restricted zone model 550 based on the outputs of the backbones.

The restricted zone model 550 may have one or more outputs. In some embodiments, the restricted zone model 550 may output one or more edges of a restricted traffic zone in the environment. An edge may connect two or more objects (e.g., cones) in the environment. The edges may be determined by analyzing the relationship between nearby construction objects. The training ground truth of these edges can be derived from the ground-truth labels for the construction zones. In embodiments where the environment includes multiple restricted traffic zones, the restricted zone model 550 may output one or more edges for each restricted traffic zone. The edges can provide a high-precision, vector-based representation of the boundaries of the restricted traffic zone. In some cases, the boundary of a restricted traffic zone can be defined by a combination of edges connecting physical markers, such as cones, and imaginary lines determined by other landmarks or road conventions. However, an edge can represent local structural information and may not include information about traffic directives.

Additionally or alternatively, the restricted zone model 550 may output information indicating per-point drivability and traffic directive, which may be generated based on a point grid generated by the point grid module 540. For instance, for each respective point in the point grid, the restricted zone model 550 may determine the drivability of the point, i.e., whether the AV can drive to or at the location represented by the point. The restricted zone model 550 may determine one or more other traffic directives at the location, such as traffic direction, preferred driving speed. The traffic direction may be classified into one of three categories: forward, backward, and bi-directional. In some embodiments, the traffic direction is determined through a multi-class classifier in the restricted zone model 550. The multi-class classifier may output a probability for each respective category. The preferred driving speed may be determined through either categorical classification (low, medium, or high) or numerical regression. The ground truth for traffic directives for training the multi-class classifier may be obtained through various sources such as ground-truth labels, maps, or vehicle trajectory history (e.g., summary statistics of trajectory history of passing vehicles). During the inference state of the multi-class classifier, computation constraints may result in a sparse output point grid. This grid can provide a general understanding of the construction zone, but it may not have sufficient resolution to provide precise boundary information for the AV to navigate within the environment.

In some embodiments, per-point drivability and traffic directive edges may be an output of the CNN backbone of the outputs of the restricted zone model 550, while edges of a restricted traffic zone may be an output of a GNN backbone. The restricted zone model 550 may combine the outputs of the CNN and GNN backbones to output one or more vectorized regions. A vectorized region includes both traffic directives and high-precision boundaries. The vectorized region can be used for downstream tasks in both overall route planning and precise trajectory planning.

The restricted zone model 550 may be trained by the training module 560 and validated by the validation module 570. In other embodiments, the restricted zone model 550, training module 560, or validation module 570 may be external to the zone modeling module 440 or even to the onboard computer 150. For instance, the restricted zone model 550, training module 560, and validation module 570 may be part of the fleet management system 120. The zone modeling module 440 may obtain a model of a restricted traffic zone through an online reference of the restricted zone model 550. Certain aspects of the restricted zone model 550 are described below in conjunction with FIG. 6.

The training module 560 trains the restricted zone model 550 by using a training dataset. The training module 560 forms the training dataset. The training dataset may include training samples and training labels. A training sample may include information of a restricted traffic zone, such as a map, tracks, point grid, temporal sequence of semantic grids, and so on. A training sample may be associated with one or more training labels. A training label may include a ground-truth edge of the restricted traffic zone, ground-truth per-point drivability, ground-truth per-point traffic derivative, ground-truth vectorized region, and so on. In some embodiments, the training dataset includes sufficient training samples to capture various traffic situations. For instance, there are situations where a police car is parked in a construction zone and is a part of the construction region boundary. In order for the restricted zone model 550 to recognize these situations, the training dataset may include one or more such training samples. In some embodiments, the training module 560 may form the training dataset by mining restricted traffic zone log snippets for supervision of positive/negative drivability, traffic directives, zone edges, and so on. Additionally or alternatively, the training module 560 may create simulation data to form the training dataset. For instance, the training module 560 may create a virtual scene that simulates an environment including a restricted traffic zone. The training module 560 may also create maps, tracks, semantic grids, or other data for the virtual scene.

In some embodiments, a part of the training dataset may be used to initially train the restricted zone model 550, and the rest of the training dataset may be held back as a validation subset used by the validation module 570 to validate performance of the restricted zone model 550 after training. The portion of the training dataset not including the validation subset may be used to train the restricted zone model 550.

The training module 560 may determine hyperparameters for training the restricted zone model 550. Hyperparameters are variables specifying the restricted zone model 550 training process. Hyperparameters are different from parameters inside the restricted zone model 550 (e.g., weights of filters). In some embodiments, hyperparameters include variables determining the architecture of the restricted zone model 550, such as number of hidden layers, etc. Hyperparameters also include variables which determine how the restricted zone model 550 is trained, such as batch size, number of epochs, etc. A batch size defines the number of training samples to work through before updating the parameters of the restricted zone model 550. The batch size is the same as or smaller than the number of samples in the training dataset. The training dataset can be divided into one or more batches. The number of epochs defines how many times the entire training dataset is passed forward and backwards through the entire network. The number of epochs defines the number of times that the deep learning algorithm works through the entire training dataset. One epoch means that each training sample in the training dataset has had an opportunity to update the parameters inside the restricted zone model 550. An epoch may include one or more batches. The number of epochs may be 4, 40, 500, 400, or even larger.

The training module 560 may define the architecture of the restricted zone model 550, e.g., based on some of the hyperparameters. The architecture of the restricted zone model 550 includes an input layer, an output layer, and a plurality of hidden layers. The input layer of the restricted zone model 550 may include data from the track module 510, semantic grid module 520, map module 530, point grid module 540, or some combination thereof. The output layer may include zone edges, per-point drivability, per-point traffic derivatives, vectorized regions, and so on. The hidden layers are layers between the input layer and output layer. Examples of the hidden layers may include one or more convolutional layers and one or more other types of layers, such as pooling layers, fully connected layers, normalization layers, softmax or logistic layers, and so on.

After the training module 560 defines the architecture of the restricted zone model 550, the training module 560 inputs the training samples into the restricted zone model 550. The training module 560 modifies the parameters inside the restricted zone model 550 ("internal parameters of the restricted zone model 550") to minimize the error between outputs of the restricted zone model 550 and the ground-truth labels of the training samples. The internal parameters include weights of filters in the convolutional layers of the restricted zone model 550. In some embodiments, the training module 560 uses a cost function to minimize the error.

The training module 560 may train the restricted zone model 550 for a predetermined number of epochs. The number of epochs is a hyperparameter that defines the number of times that the deep learning algorithm will work through the entire training dataset. One epoch means that each sample in the training dataset has had an opportunity to update internal parameters of the restricted zone model 550. After the training module 560 finishes the predetermined number of epochs, the training module 560 may stop updating the parameters in the restricted zone model 550. The restricted zone model 550 having the updated parameters is referred to as a trained restricted zone model 550.

The validation module 570 validates performance of the restricted zone model 550 after training. In some embodiments, the validation module 570 inputs samples in a validation dataset into the restricted zone model 550 and uses the outputs of the restricted zone model 550 to determine the model accuracy. In some embodiments, a validation dataset may be formed of some or all the samples in the training dataset. Additionally or alternatively, the validation dataset includes additional samples, other than those in the training sets.

In some embodiments, the validation module 570 may evaluate the performance of the restricted zone model 550 using three levels of metrics: point level, edge level, and region level. The point level of metrics may assess the estimation on the point grid. An example of the point level of metrics may include drivability precision or recall, traffic direction precision or recall and confusion matrix, and confusion matrix for preferred speed classification or mean absolute error for preferred speed regression. The edge level of metrics may evaluate the estimation of zone edges and may include edge precision or recall. The region level of metrics may evaluate the performance of the vectorized regions. In some embodiments, region-based metrics such as Intersection over Union (IOU) can be applied.

In some embodiments, the validation module 570 may determine an accuracy score measuring the precision, recall, or a combination of precision and recall of the restricted zone model 550. The validation module 570 may use the following metrics to determine the accuracy score: Precision=TP/(TP+FP) and Recall=TP/(TP+FN), where TP is true positives, FP is false positives, and FN false negatives. The F-score (F-score=2*PR/(P+R)) may unify precision and recall into a single measure, where P is precision and R is recall.

The validation module 570 may compare the accuracy score with a threshold score. In an example where the validation module 570 determines that the accuracy score of the augmented model is less than the threshold score, the validation module 570 instructs the training module 560 to re-train the restricted zone model 550. In one embodiment, the training module 560 may iteratively re-train the restricted zone model 550 until the occurrence of a stopping condition, such as the accuracy measurement indication that the restricted zone model 550 may be sufficiently accurate, or a number of training rounds having taken place.

Example Process of Modeling Restricted Traffic Zone

Figure 6:
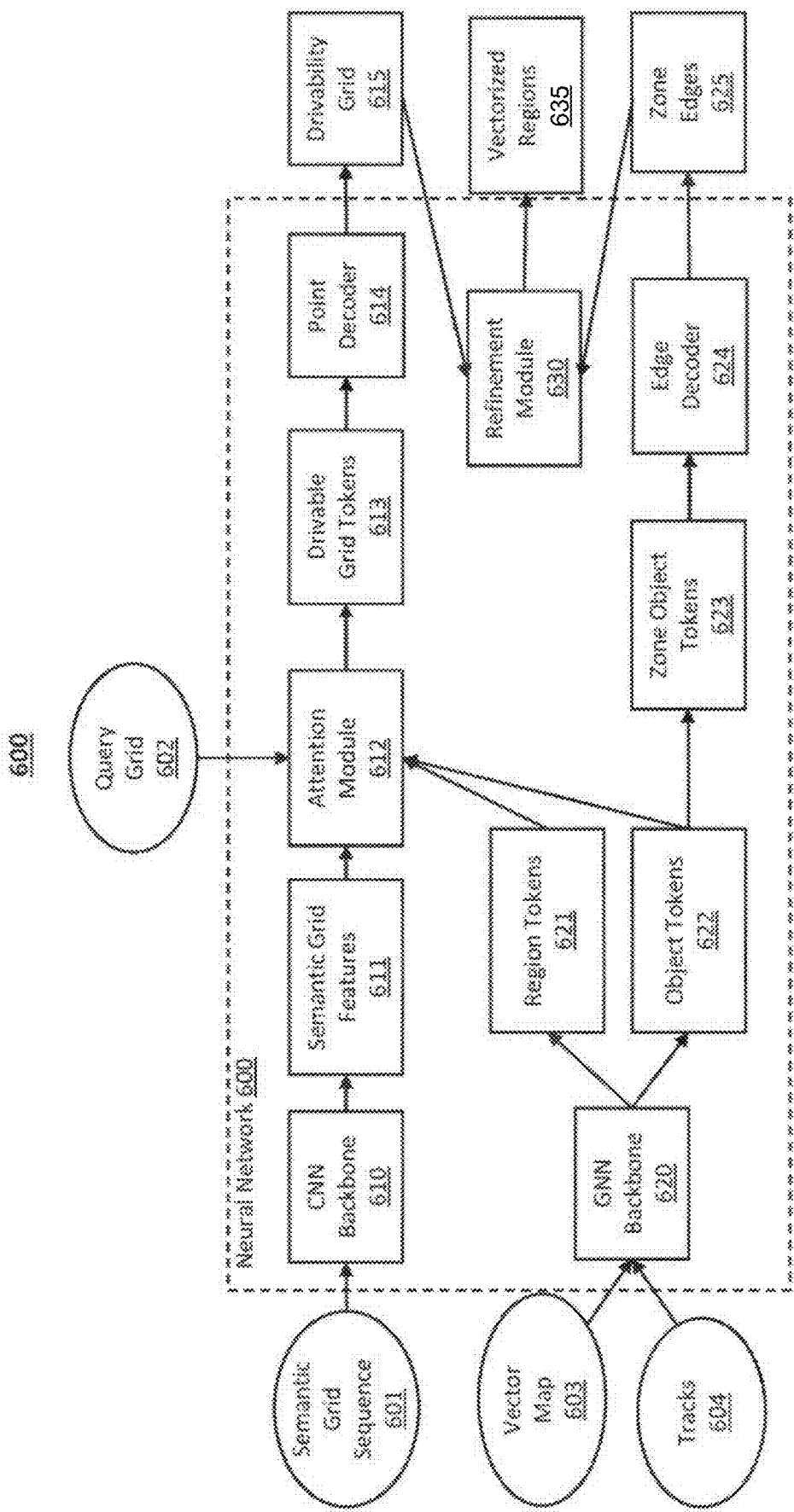
FIG. 6 illustrates a process of modeling a restricted traffic zone by using a neural network, according to some embodiments of the present disclosure.

FIG. 6 illustrates a process of modeling a restricted traffic zone by using a neural network 600, according to some embodiments of the present disclosure. The process may be performed by the zone modeling module 440. The neural network 600 may be an embodiment of the restricted zone model 550 in FIG. 5. The neural network 600 includes a CNN backbone 610 and a GNN backbone 620. The CNN backbone 610 may be used to encode semantic grids. An RNN (recurrent neural network) may be used to aggregate temporal information. The CNN backbone may include a CNN-LSTM (long short-term memory) network. The GNN backbone 620 is used for encoding tracks and vector maps. Either sequential or global transformers may be used. The GNN backbone 620 may output region tokens for map elements and object tokens for tracks.

As shown in FIG. 6, a semantic grid sequence 601 and a query grid 602 are input into the CNN backbone 610. The semantic grid sequence 601 may be generated by the semantic grid module 520. The query grid 602 may be generated by the point grid module 540. A vector map 603 and tracks 604 are input into the GNN backbone 620. The vector map 603 may be generated by the map module 530. The tracks 604 may be generated by the track module 510.

The CNN backbone 610 extracts semantic grid features 611 from the semantic grid sequence 601, e.g., through one or more convolutions or other deep learning operations. The semantic grid features 611 are input into an attention module 612. The attention module 612 may gather and attend embedding features from region tokens 621, object tokens 622, and the semantic grid features 611 to the query grid 602. The attention module 612 may be a location-based cross attention module. The attention module 612 generates drivable grid tokens 613. The drivable grid tokens 613 are input into a point decoder 614. The point decoder 614 decodes the query grid 602 and the drivable grid tokens 613 to generate a drivability grid 615. The drivability grid 615 includes at least some of the points in the query grid 602. For each point, the point decoder 614 determines drivability at the point. The point decoder 614 may also determine a preferred driving speed (or a preferred driving speed range), a traffic direction, or one or more other traffic derivatives at the point.

The GNN backbone 620 generates the region tokens 621 and the object tokens 622 from the vector map 603 and the tracks 604. The region tokens 621 and the object tokens 622 are provided to the attention module 612, as described above. Zone object tokens 623 are generated from the object tokens 622. The zone object tokens 623 are input into an edge decoder 624, which determines zone edges 625. In some embodiments, the edge decoder 624 may predict the likelihood of connections among the objects associated with the tracks 604. The edge decoder 624 may output edge-level messages, which may be applied to the nodes representing objects.

In some embodiments, the drivability grid 615 is an output of the CNN backbone 610, and the zone edges 625 is an output of the GNN backbone 620. The drivability grid 615 and the zone edges 625 are input into a refinement module 630. The refinement module 630 performs a refinement process and generates vectorized regions 635 based on the drivability grid 615 and the zone edges 625. The refinement process may be a post-process combining the drivability grid 615 and the zone edges 625 to generate the vectorized regions 635 with traffic directives. The refinement process may not require loss functions during training and gradients are not propagated back to the neural network 600. In some embodiments, the refinement module 630 generates iso-polylines from the drivability grid 615 or the query grid 602 based on the drivable probability and the traffic direction. The iso-polylines may divide the restricted traffic zone into regions, which may be represented by iso-polygons. The refinement module 630 may also refine the boundary of iso-polygons based on the zone edges 625. The drivability grid 615, the zone edges 625, the vectorized regions 635, or some combination thereof may constitute a model of the restricted traffic zone and may be used for navigating the AV in or surrounding the restricted traffic zone.

Example Models of Restricted Traffic Zone

FIGS. 7A-7D illustrate example outputs of a neural network modeling a restricted traffic zone 700, according to some embodiments of the present disclosure. An embodiment of the neural network may be the restricted zone model 550 in FIG. 5 or the neural network 600 in FIG. 6. An AV 705 is about to enter the restricted traffic zone 700. The AV 705 is represented by a triangle, which indicates the driving direction of the AV 705 is towards the restricted traffic zone 700. The modeling of the restricted traffic zone 700 is for navigating the AV 705 surrounding or in the restricted traffic zone 700. The modeling of the restricted traffic zone 700 may be through an inference of the neural network. The inference may be a local inference, which may be run by an onboard computer of the AV 705 (e.g., the onboard computer 150). Alternatively, the inference may be an online inference, which may be run by the fleet management system 120.

Figure 7A:
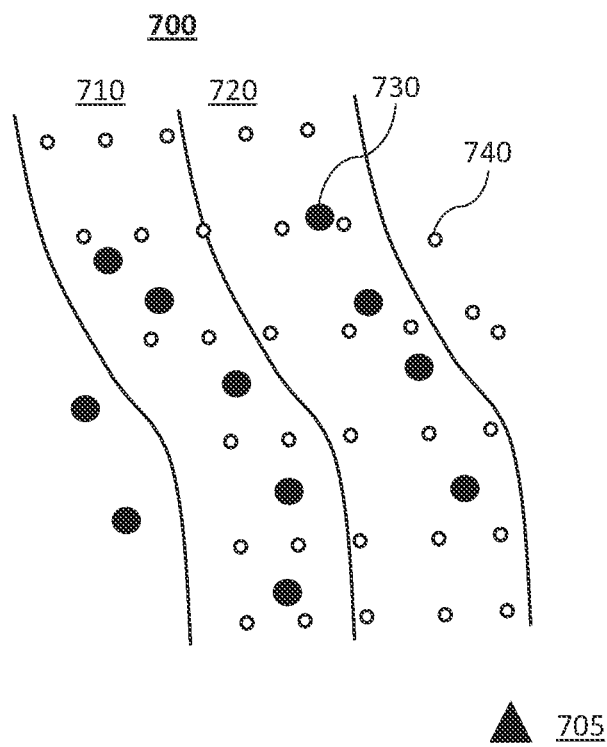
FIGS. 7A-7D illustrate example outputs of a neural network modeling a restricted traffic zone, according to some embodiments of the present disclosure.

FIG. 7A illustrates the restricted traffic zone 700. The restricted traffic zone 700 may be a construction zone, for example. The restricted traffic zone 700 includes two lanes 710 and 720. The boundaries of the two lanes 710 and 720 are represented by curved lines in FIG. 7A. Traffic in the two lanes 710 and 720 are restricted due to construction. FIG. 7A shows a plurality of construction cones 730 (individually referred to as "construction cone 730") placed in the two lanes 710 and 720. The left lane 710 is closed, and channelization is formed according to the arrangement of the construction cones 730. FIG. 7A also shows a point grid including a plurality of points 740 (individually referred to as "point 740"). Each point 740 represents a respective location in the restricted traffic zone 700. The points 740 may be selected by sampling locations in the restricted traffic zone 700. Each point 740 may be a query point, the drivability of which is to be determined by the neural network.

Figure 7B:
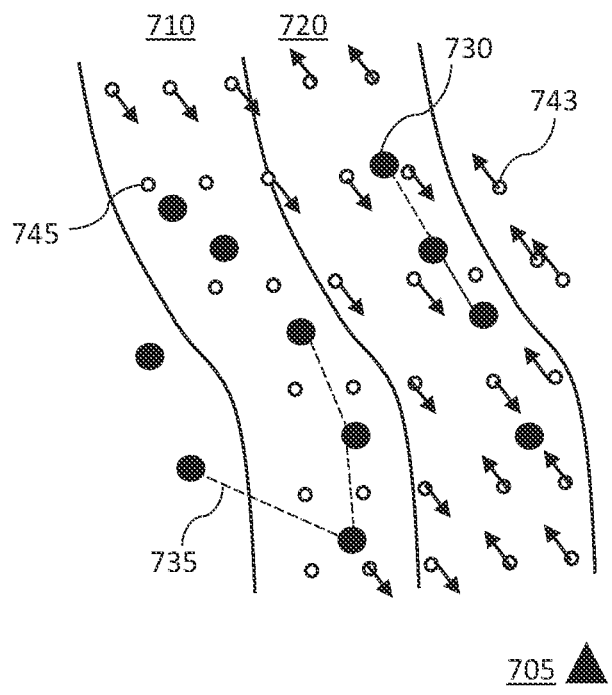

FIG. 7B illustrates zone edges 735 (individually referred to as "zone edge 735") and a drivability grid comprising points 743 (individually referred to as "point 743") and points 745 (individually referred to as "point 745"). The zone edges 735 and the drivability grid are output by the neural network. In some embodiments, the zone edges may be an output of an edge decoder in the neural network, e.g., the edge decoder 624 in FIG. 6. The zone edges 735 are represented by dashed polylines in FIG. 7B. The zone edges 735 can refine the boundaries of the restricted traffic zone 700. This can achieve a high precision by using a large probability edge threshold.

The drivability grid may be an output of a point decoder in the neural network, e.g., the point decoder 614 in FIG. 6. The points 743 are determined to be locations with high drivable probability, e.g., the probabilities that the AV can drive to or at the locations are above a threshold probability. Each point 743 is also associated with an arrow that indicates the traffic direction at the corresponding location. The traffic direction is estimated by the neural network. Even though not shown in FIG. 7B, each point 743 may also be associated with one or more preferred driving speeds determined by the neural network, e.g., a driving speed at which the AV should use to drive to or at the location for a safety operation of the AV. The points 745 are determined to be locations with low drivable probability, e.g., the probabilities that the AV can drive to or at the locations are below a threshold probability.

Figure 7C:
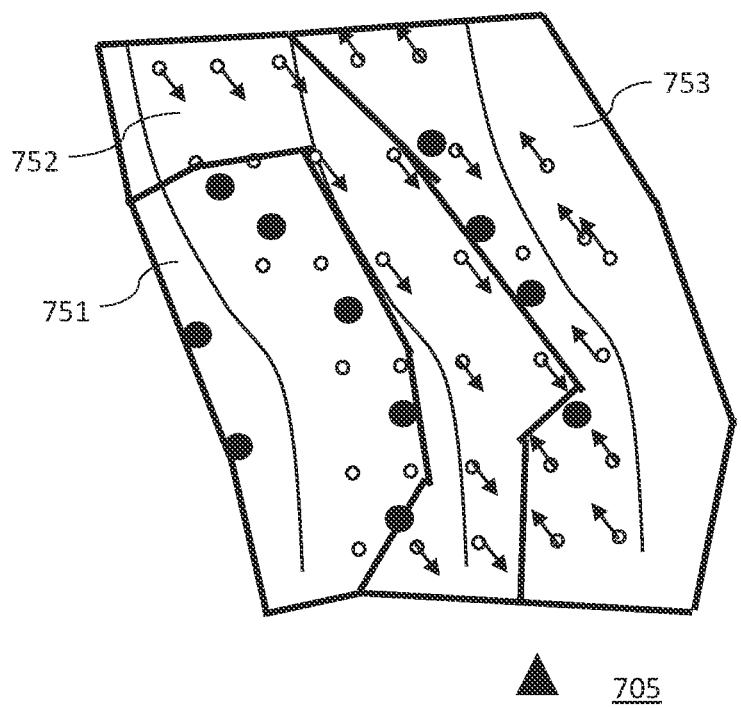

FIG. 7C shows iso-polylines generated from the drivability grid in FIG. 7B. The iso-polylines divide the restricted traffic zone 700 into three regions 751, 752, and 753. The region 751 is a closed region, where traffic is not allowed. The regions 752 and 753 are drivable regions with opposing traffic directions. As shown in FIG. 7C, the traffic direction in the region 752 is opposite the traffic direction of the AV 705, while the traffic direction in the region 753 is along the traffic direction of the AV 705. These iso-polylines provide an overall understanding of the layout and topology of the regions 751, 752, and 753 within the restricted traffic zone 700. However, the accuracy of the region boundaries may be limited by the resolution of the point grid or drivability grid.

Figure 7D:
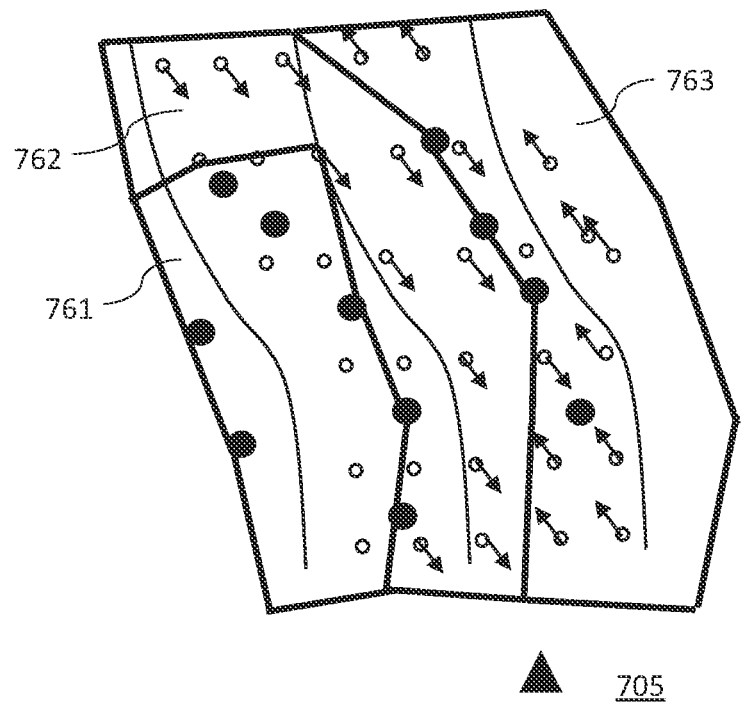

FIG. 7D illustrates a result of boundary refinement based on the zone edges 735 in FIG. 7B and the iso-polylines in FIG. 7C. The boundary refinement may be done by the refinement module 630 in FIG. 6. The boundary refinement produces three regions 761, 762, and 763, the boundaries of which are determined by adjusting the boundaries of the regions 751, 752, and 753, e.g., by using the zone edges 735 that are located near or on the boundaries of the regions 751, 752, and 753. As shown in FIG. 7D, the boundaries of the regions 761, 762, and 763 at least substantially overlap with the zone edges 735.

Example Method of Modeling Restricted Traffic Zone

Figure 8:
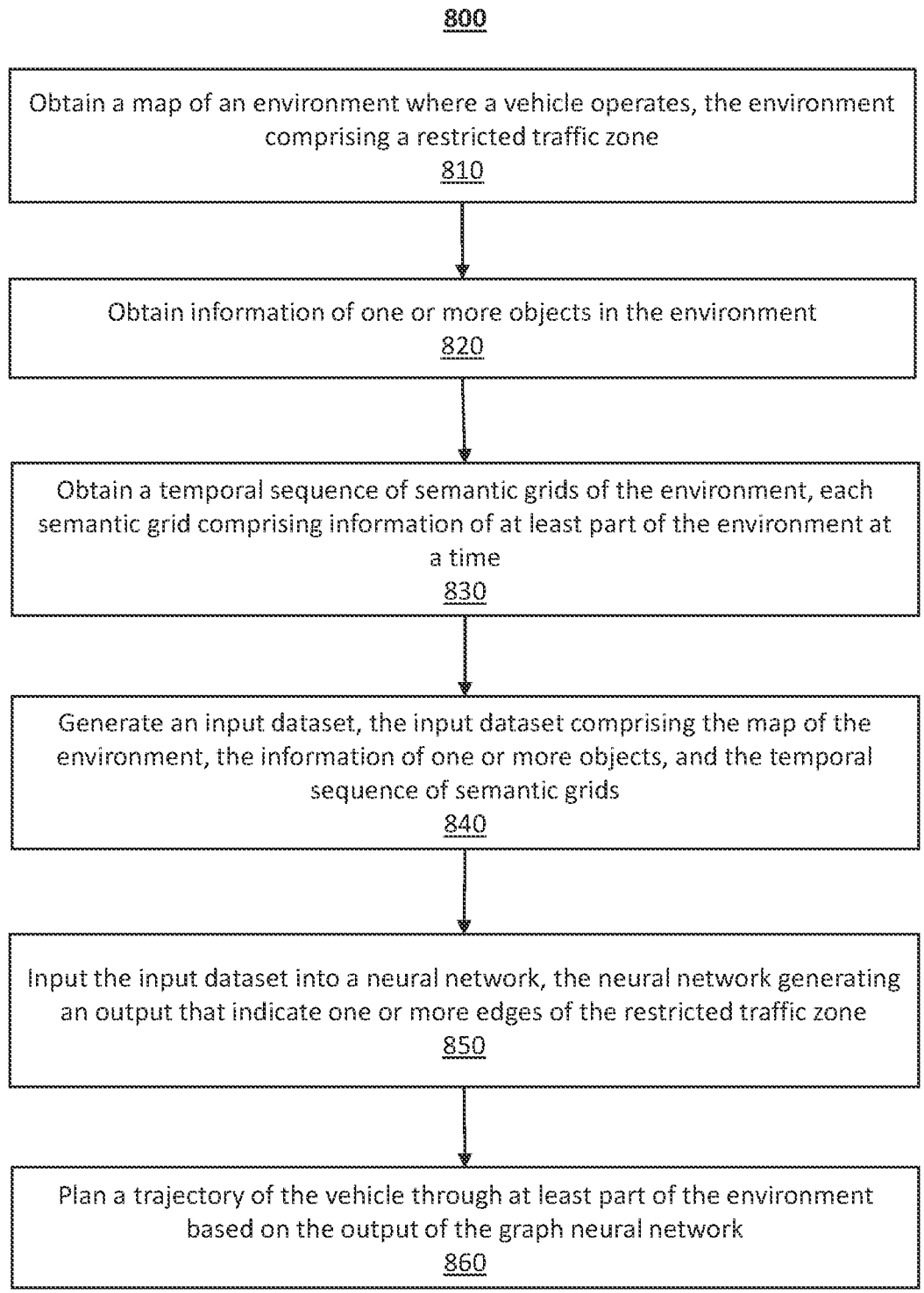
FIG. 8 is a flowchart showing a method of modeling a restricted traffic zone, according to some embodiments of the present disclosure.

FIG. 8 is a flowchart showing a method 800 of modeling a restricted traffic zone, according to some embodiments of the present disclosure. The method 800 may be performed by the zone modeling module 440. Although the method 800 is described with reference to the flowchart illustrated in FIG. 8, many other methods of modeling restricted traffic zones may alternatively be used. For example, the order of execution of the steps in FIG. 8 may be changed. As another example, some of the steps may be changed, eliminated, or combined.

The zone modeling module 440 obtains 810 a map of an environment where a vehicle operates. The environment may include a real-world area where the vehicle navigates. The environment comprises a restricted traffic zone. The map may be a vector map.

The zone modeling module 440 obtains 820 information of one or more objects in the restricted traffic zone. In some embodiments, the one or more objects comprises an additional vehicle operating in the environment. The information of the one or more objects comprises a driving speed or an orientation of the additional vehicle.

The zone modeling module 440 obtains 830 a temporal sequence of semantic grids of the restricted traffic zone. Each semantic grid comprises information of at least part of the restricted traffic zone at a time. In some embodiments, the temporal sequence of semantic grids comprises semantic grids representing an area in the environment at different times. Each semantic grid representing the area comprises information indicating that the area is occupied by an object and information describing the object.

The zone modeling module 440 generates 840 an input dataset. The input dataset comprises the map of the environment, the information of one or more objects, and the temporal sequence of semantic grids.

The zone modeling module 440 inputs 850 the input dataset into a neural network. The neural network generates an output that indicates one or more edges of the restricted traffic zone. In some embodiments, the neural network comprises a CNN and a GNN. In some embodiments, the one or more edges of the restricted traffic zone are determined by the GNN.

In some embodiments, the output of the neural network further comprises information associated with one or more points in the environment. Information associated with each respective point indicates whether the vehicle can drive to the respective point. The information associated with the one or more points may be generated by the CNN. In some embodiments, the output of the neural network further comprises one or more polylines that divide the environment into a plurality of regions. The output of the neural network further comprises information indicating that the vehicle can drive in a region of the plurality of regions and specifying a traffic direction of the region.

In some embodiments, the zone modeling module 440 inputs the map of the environment and the information of the one or more objects into the GNN. The zone modeling module 440 inputs the temporal sequence of semantic grids into the CNN.

The zone modeling module 440 plans 860 a trajectory of the vehicle through at least part of the environment based on the output of the neural network. In some embodiments, the zone modeling module 400 provides the output of the neural network to a control module of the vehicle, such as the control module 450. The control module 450 may plan the trajectory of the vehicle based on the output of the neural network.

SELECT EXAMPLES

Example 1 provides a method, including obtaining a map of an environment where a vehicle operates, the environment including a restricted traffic zone; obtaining information of one or more objects in the restricted traffic zone; obtaining a temporal sequence of semantic grids of the restricted traffic zone, each semantic grid including information of at least part of the restricted traffic zone at a time; generating an input dataset, the input dataset including the map of the environment, the information of one or more objects, and the temporal sequence of semantic grids; inputting the input dataset into a neural network, the neural network generating an output that indicates one or more edges of the restricted traffic zone; and planning a trajectory of the vehicle through at least part of the environment based on the output of the neural network.

Example 2 provides the method of example 1, where the neural network includes a CNN and a GNN.

Example 3 provides the method of example 2, where inputting the input dataset into the neural network includes inputting the map of the environment and the information of the one or more objects into the GNN; and inputting the temporal sequence of semantic grids into the CNN.

Example 4 provides the method of any of the preceding examples, where the one or more objects includes an additional vehicle operating in the environment, and the information of the one or more objects includes a driving speed or an orientation of the additional vehicle.

Example 5 provides the method of any of the preceding examples, where the temporal sequence of semantic grids includes semantic grids representing an area in the environment at different times, and each semantic grid representing the area includes information indicating that the area is occupied by an object and information describing the object.

Example 6 provides the method of any of the preceding examples, where the neural network includes a CNN and a GNN, and the one or more edges of the restricted traffic zone are determined by the GNN.

Example 7 provides the method of any of the preceding examples, where the output of the neural network further includes information associated with one or more points in the environment, and information associated with each respective point indicates whether the vehicle can drive to the respective point.

Example 8 provides the method of example 7, where the neural network includes a CNN and a GNN, and the information associated with the one or more points is generated by the CNN.

Example 9 provides the method of any of the preceding examples, where the output of the neural network further includes one or more polylines that divide the environment into a plurality of regions.

Example 10 provides the method of example 9, where the output of the neural network further includes information indicating that the vehicle can drive in a region of the plurality of regions and specifying a traffic direction of the region.

Example 11 provides one or more non-transitory computer-readable media storing instructions executable to perform operations, the operations including obtaining a map of an environment where a vehicle operates, the environment including a restricted traffic zone; obtaining information of one or more objects in the restricted traffic zone; obtaining a temporal sequence of semantic grids of the restricted traffic zone, each semantic grid including information of at least part of the restricted traffic zone at a time; generating an input dataset, the input dataset including the map of the environment, the information of one or more objects, and the temporal sequence of semantic grids; inputting the input dataset into a neural network, the neural network generating an output that indicates one or more edges of the restricted traffic zone; and planning a trajectory of the vehicle through at least part of the environment based on the output of the neural network.

Example 12 provides the one or more non-transitory computer-readable media of example 11, where the neural network includes a CNN and a GNN.

Example 13 provides the one or more non-transitory computer-readable media of example 12, where inputting the input dataset into the neural network includes inputting the map of the environment and the information of the one or more objects into the GNN; and inputting the temporal sequence of semantic grids into the CNN.

Example 14 provides the one or more non-transitory computer-readable media of any one of examples 11-13, where the one or more objects includes an additional vehicle operating in the environment, and the information of the one or more objects includes a driving speed or an orientation of the additional vehicle.

Example 15 provides the one or more non-transitory computer-readable media of any one of examples 11-14, where the temporal sequence of semantic grids includes semantic grids representing an area in the environment at different times, and each semantic grid representing the area includes information indicating that the area is occupied by an object and information describing the object.

Example 16 provides the one or more non-transitory computer-readable media of any one of examples 11-15, where the neural network includes a CNN and a GNN, and the one or more edges of the restricted traffic zone are determined by the GNN.

Example 17 provides the one or more non-transitory computer-readable media of any one of examples 11-16, where the output of the neural network further includes information associated with one or more points in the environment, information associated with each respective point indicating whether the vehicle can drive to the respective point; or information indicating that the vehicle can drive in a region in the environment and specifying a traffic direction of the region.

Example 18 provides a computer system, including a computer processor for executing computer program instructions; and one or more non-transitory computer-readable media storing computer program instructions executable by the computer processor to perform operations including obtaining a map of an environment where a vehicle operates, the environment including a restricted traffic zone, obtaining information of one or more objects in the restricted traffic zone, obtaining a temporal sequence of semantic grids of the restricted traffic zone, each semantic grid including information of at least part of the restricted traffic zone at a time, generating an input dataset, the input dataset including the map of the environment, the information of one or more objects, and the temporal sequence of semantic grids, inputting the input dataset into a neural network, the neural network generating an output that indicates one or more edges of the restricted traffic zone, and planning a trajectory of the vehicle through at least part of the environment based on the output of the neural network.

Example 19 provides the computer system of example 18, where the neural network includes a CNN and a GNN, and inputting the input dataset into the neural network includes inputting the map of the environment and the information of the one or more objects into the GNN; and inputting the temporal sequence of semantic grids into the CNN.

Example 20 provides the computer system of example 18 or 19, where the output of the neural network further includes information associated with one or more points in the environment, information associated with each respective point indicating whether the vehicle can drive to the respective point; or information indicating that the vehicle can drive in a region in the environment and specifying a traffic direction of the region.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the figures may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

What is claimed is:

1. A method, comprising:
    obtaining a map of an environment where a vehicle operates, the environment comprising a restricted traffic zone;
    obtaining information of one or more objects in the restricted traffic zone; obtaining a temporal sequence of semantic grids of the restricted traffic zone, each semantic grid comprising information of at least part of the restricted traffic zone at a time;
    generating an input dataset, the input dataset comprising the map of the environment, the information of one or more objects, and the temporal sequence of semantic grids;
    inputting the input dataset into a neural network, the neural network generating an output that indicates one or more edges of the restricted traffic zone, wherein the output of the neural network further includes one or more polylines that divide the environment into a plurality of regions;
    wherein the neural network comprises a convolutional neural network and a graph neural network;
    wherein inputting the input dataset into the neural network comprises:
    inputting the map of the environment and the information of the one or more objects into the graph neural network; and
    inputting the temporal sequence of semantic grids into the convolutional neural network;
    planning a trajectory of the vehicle through at least part of the environment based on the output of the neural network; and
    causing the vehicle to maneuver through the at least part of the environment based on the trajectory, the maneuvering comprising at least one of controlling an engine throttle, controlling a motor speed, controlling brakes of the vehicle, or steering the vehicle.

2. The method of claim 1, wherein the one or more objects comprises an additional vehicle operating in the environment, and the information of the one or more objects comprises a driving speed or an orientation of the additional vehicle.

3. The method of claim 1, wherein the temporal sequence of semantic grids comprises semantic grids representing an area in the environment at different times, and each semantic grid representing the area comprises information indicating that the area is occupied by an object and information describing the object.

4. The method of claim 1, wherein the neural network comprises a convolutional neural network and a graph neural network, and the one or more edges of the restricted traffic zone are determined by the graph neural network.

5. The method of claim 1, wherein the output of the neural network further comprises information associated with one or more points in the environment, and information associated with each respective point indicates whether the vehicle can drive to the respective point.

6. The method of claim 5, wherein the neural network comprises a convolutional neural network and a graph neural network, and the information associated with the one or more points is generated by the convolutional neural network.

7. The method of claim 1, wherein the output of the neural network further comprises information indicating that the vehicle can drive in a region of the plurality of regions and specifying a traffic direction of the region.

8. One or more non-transitory computer-readable media storing instructions executable to perform operations, the operations comprising:
    obtaining a map of an environment where a vehicle operates, the environment comprising a restricted traffic zone;
    obtaining information of one or more objects in the restricted traffic zone; obtaining a temporal sequence of semantic grids of the restricted traffic zone, each semantic grid comprising information of at least part of the restricted traffic zone at a time;
    generating an input dataset, the input dataset comprising the map of the environment, the information of one or more objects, and the temporal sequence of semantic grids;
    inputting the input dataset into a neural network, the neural network generating an output that indicates one or more edges of the restricted traffic zone, wherein the output of the neural network further comprises one or more polylines that divide the environment into a plurality of regions;
    wherein the neural network comprises a convolutional neural network and a graph neural network;
    wherein inputting the input dataset into the neural network comprises:
    inputting the map of the environment and the information of the one or more objects into the graph neural network; and
    inputting the temporal sequence of semantic grids into the convolutional neural network;
    planning a trajectory of the vehicle through at least part of the environment based on the output of the neural network; and
    causing the vehicle to maneuver through the at least part of the environment based on the trajectory, the maneuvering comprising at least one of controlling an engine throttle, controlling a motor speed, controlling brakes of the vehicle, or steering the vehicle.

9. The one or more non-transitory computer-readable media of claim 8, wherein the one or more objects comprises an additional vehicle operating in the environment, and the information of the one or more objects comprises a driving speed or an orientation of the additional vehicle.

10. The one or more non-transitory computer-readable media of claim 8, wherein the temporal sequence of semantic grids comprises semantic grids representing an area in the environment at different times, and each semantic grid representing the area comprises information indicating that the area is occupied by an object and information describing the object.

11. The one or more non-transitory computer-readable media of claim 8, wherein the neural network comprises a convolutional neural network and a graph neural network, and the one or more edges of the restricted traffic zone are determined by the graph neural network.

12. The one or more non-transitory computer-readable media of claim 8, wherein the output of the neural network further comprises:
- information associated with one or more points in the environment, information associated with each respective point indicating whether the vehicle can drive to the respective point; or
- information indicating that the vehicle can drive in a region in the environment and specifying a traffic direction of the region.

13. A computer system, comprising:
- a computer processor for executing computer program instructions; and
- one or more non-transitory computer-readable media storing computer program instructions executable by the computer processor to perform operations comprising:
- obtaining a map of an environment where a vehicle operates, the environment comprising a restricted traffic zone,
- obtaining information of one or more objects in the restricted traffic zone,
- obtaining a temporal sequence of semantic grids of the restricted traffic zone, each semantic grid comprising information of at least part of the restricted traffic zone at a time,
- generating an input dataset, the input dataset comprising the map of the environment, the information of one or more objects, and the temporal sequence of semantic grids,
- inputting the input dataset into a neural network, the neural network generating an output that indicates one or more edges of the restricted traffic zone,
- wherein the neural network comprises a convolutional neural network and a graph neural network, and
- inputting the input dataset into the neural network comprises:
- inputting the map of the environment and the information of the one or more objects into the graph neural network; and
- inputting the temporal sequence of semantic grids into the convolutional neural network;
- planning a trajectory of the vehicle through at least part of the environment based on the output of the neural network, wherein the output of the neural network further includes one or more polylines that divide the environment into a plurality of regions; and
- causing the vehicle to maneuver through the at least part of the environment based on the trajectory, the maneuvering comprising at least one of controlling an engine throttle, controlling a motor speed, controlling brakes of the vehicle, or steering the vehicle.

14. The computer system of claim 13, wherein the output of the neural network further comprises:
- information associated with one or more points in the environment, information associated with each respective point indicating whether the vehicle can drive to the respective point; or
- information indicating that the vehicle can drive in a region in the environment and specifying a traffic direction of the region.

* * * * *